United States Patent [19]

Powell et al.

[11] Patent Number: 5,477,953
[45] Date of Patent: Dec. 26, 1995

[54] FILTER AND FILTER CLEANING SYSTEM FOR A REVERSE VENDING MACHINE

[75] Inventors: Ken R. Powell; Hon Zhang, both of Centreville, Va.

[73] Assignee: Environmental Products Corporation, Fairfax, Va.

[21] Appl. No.: 148,620

[22] Filed: Nov. 8, 1993

Related U.S. Application Data

[63] Continuation-in-part of Ser. No. 132,233, Oct. 6, 1993, Pat. No. 5,355,987, which is a continuation of Ser. No. 851,494, Mar. 16, 1992, abandoned.

[51] Int. Cl.⁶ .......................................................... G07F 7/06
[52] U.S. Cl. ........................................... 194/209; 406/172
[58] Field of Search ................................... 194/208, 209; 406/171, 172; 55/272, 302

[56] References Cited

U.S. PATENT DOCUMENTS

| | | |
|---|---|---|
| 2,368,787 | 2/1945 | Skinner . |
| 3,273,943 | 9/1966 | Russell .................... 55/272 X |
| 3,665,547 | 5/1972 | Boylan . |
| 3,735,566 | 5/1973 | Laliwala . |
| 4,113,449 | 9/1978 | Bundy ........................... 55/96 |
| 4,247,227 | 1/1981 | Gohler et al. ............. 406/172 X |
| 4,298,360 | 11/1981 | Poll ............................ 55/273 |
| 4,576,289 | 3/1986 | Jarrett et al. ............ 209/930 X |
| 4,667,832 | 5/1987 | Reinfeld .................. 209/930 X |
| 5,002,594 | 3/1991 | Merritt ........................ 55/302 |
| 5,030,259 | 7/1991 | Bryant et al. ................ 55/302 |
| 5,096,473 | 3/1992 | Sassa et al. ............... 55/302 X |
| 5,143,528 | 9/1992 | Dongelmans ................. 55/283 |
| 5,167,676 | 12/1992 | Nakaishi et al. .............. 55/96 |
| 5,171,338 | 12/1992 | Baert ......................... 55/302 |
| 5,226,519 | 7/1993 | DeWoolfson ................ 194/209 |

*Primary Examiner*—F. J. Bartuska
*Attorney, Agent, or Firm*—Finnegan, Henderson, Farabow, Garrett & Dunner

[57] ABSTRACT

A commodity densification and storage assembly has a housing having an insert port for receiving a commodity, such as aluminum cans, glass bottles, and PET bottles. The assembly further includes a device for densifying the commodity oriented downstream of the insert port; a storage device for storing the densified commodity; and a pneumatic device for conveying the densified commodity to the storage device. The pneumatic device includes an inlet pipe for receiving the densified commodity from the densifying device. The inlet pipe is in communication with the storage device. The pneumatic device further has a blower for creating suction and an outlet pipe in communication with the storage device and the blower. The blower draws the densified commodity to the storage device through the inlet pipe via suction. Additionally, the pneumatic device includes an air filter system for preventing densified commodity from entering the blower. The filter system includes a cartridge filter and a device for storing and delivering fluid under pressure. The blower draws air that passes in sequence through the inlet pipe, through the storage device, through a primary filter, and through the cartridge filter in a first direction. The device for storing and delivering fluid under pressure to the cartridge filter causes the introduced fluid to pass through the cartridge filter in a second direction opposite the first direction for cleaning the cartridge filter.

22 Claims, 14 Drawing Sheets

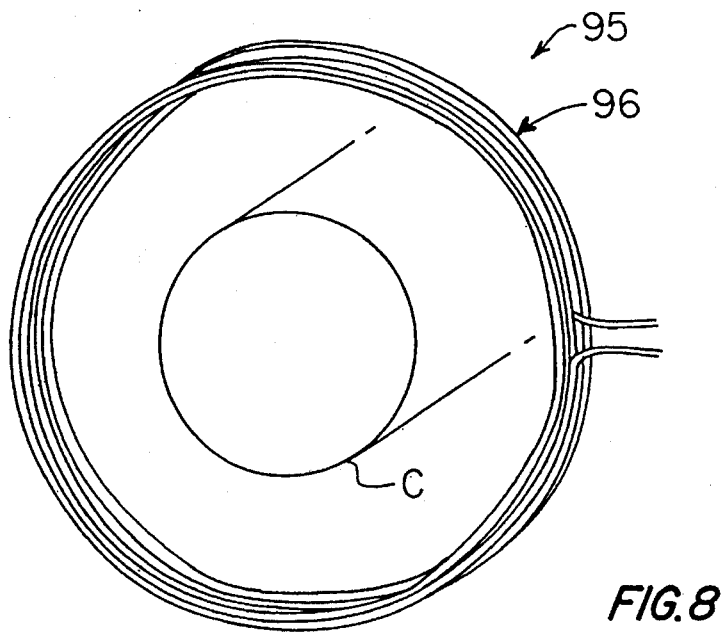
FIG.8
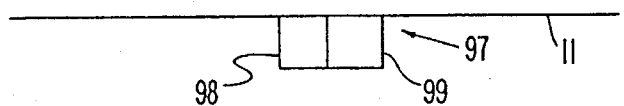
FIG.9
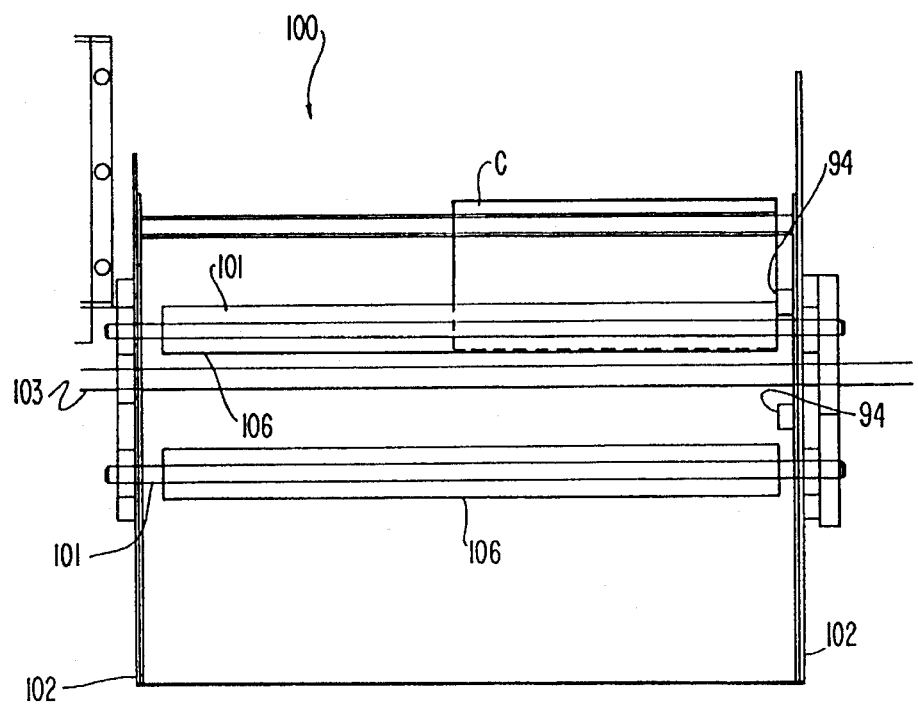

FILTER AND FILTER CLEANING SYSTEM FOR A REVERSE VENDING MACHINE

This application is a continuation-in-part of U.S. patent application Ser. No. 08/132,233, filed Oct. 6, 1993, now U.S. Pat. No. 5,355,987 which is a continuation of U.S. patent application Ser. No. 07/851,494, filed Mar. 16, 1992, now abandoned incorporated by reference herein.

BACKGROUND OF THE INVENTION

1. Field of the Invention

This invention relates to the collection, densification and storage of recyclable commodities, and more particularly to a machine for densifying and storing recyclable commodities that utilizes a pneumatic device for creating suction to convey densified commodity into storage. Even more particularly, it relates to a filter system for preventing densified commodity from entering the pneumatic device and releasing to the atmosphere, the filter system having filter cleaning capabilities.

2. Description of the Prior Art

With the increasing emphasis in recent years on environmental protection, the recycling of used beverage containers and other similar commodities has become an important factor in the conservation effort. More specifically, the recycling of aluminum, glass and plastic containers has proven to be environmentally beneficial.

On the other hand, non-returnable containers for beverages and other goods are widely used because their cost has been less than the cost of recycling and/or cleaning reusable deposit containers and bottles. One significant effect of the widespread use of non-deposit containers has been increased litter in public places, and overflow of garbage dumps and landfills.

To combat litter and increase the amount of material that is recycled, several states have enacted mandatory "deposit laws" which require the use of containers having an added deposit cost. When the customer purchases a product in such a container, a container deposit, typically one to five cents, is added to the purchase price. After consumption of the product, the consumer can obtain a refund of the deposit by returning the empty container, often to the retailer, for recycling. The amount of the deposit may be adjusted to create an incentive for returning the container that is greater than the inconvenience in doing so. In these states, retailers generally collect the used containers and sell them to distributors or others who pay the retailer for the scrap value of the containers plus an amount to cover the retailer's handling costs.

Since the high labor cost of processing recycled material often makes recycling uneconomic, especially for retailers, various automatic machines that accept material for recycling and issue deposit refunds have been proposed. These machines relieve the burdens on the grocery industry and those who must collect the containers, pay the refunds, and store the returned commodities. For example, Applicants' assignee is the owner of U.S. Pat. Nos. 4,324,325, 4,345, 679, 4,440,284, 4,469,212, 4,492,295, 4,573,641, 4,579,216, 4,784,251, and 5,226,519. All of these patents relate to machines and systems for automated redemption of beverage containers.

Another approach to improving the economics of recycling is to increase the scrap value of the recycled material. One method for increasing the scrap value is to segregate the returned material into groups whose scrap price is inherently higher than the scrap price of unsegregated material. Separation of scrap by composition (for example, glass and plastic) or by color (for example, clear glass and green glass) greatly increases the value of the scrap material. Separation of plastic scrap further according to chemical make-up is also desirable with vinyl-based container scrap being excluded from mixture with high density polyethylene, polypropylene, and polyethylene terephthaleate (PET) container scrap.

In the past, segregation of returned containers has been labor intensive, so that the labor to perform the sorting can sometimes cost more than the increase in resale value of the segregated material.

The device disclosed in U.S. Pat. No. 5,226,519 discloses a device for receiving various different types of commodities and maintaining separation of each type. However, this device includes a plurality of collection stations for receiving a plurality of commodities through a plurality of insert ports, each port for receiving one different predetermined type of commodity. The device requires the consumer to first insert all containers of one type (for example, cans) into one collection station, and receive a payment for those containers. Next, the consumer inserts containers of another type in another collection station for a separate payment. A consumer having three types of containers to recycle must therefore stand in three separate lines at three separate collection stations and receive three separate payments. Further, the multiple stations require the retailer to provide a large amount of space to house the devices.

Prior recycling machines have used a variety of distribution systems to move the shredded, crushed, or densified containers to storage. Gravity, feeding paddles, forced air blowers, vacuum systems, and conveyor systems, have been used with varying degrees of success. Recycling machines that have used vacuum systems have been extremely effective at moving the densified materials into storage.

The vacuum system has a filter to prevent particles of densified containers from going into the vacuum device itself and the atmosphere. The hostile environment of densified aluminum, PET, and especially glass creates problems with filter clogging. Glass is particularly harsh on the filter due to dust sized particles of glass becoming imbedded in the filter. A clogged filter in the vacuum system will cause insufficient airflow for moving the densified commodity to storage and cause the filter media damage, thereby causing the machine to fail. This situation is especially undesirable in jurisdictions where retailers are obligated to accept returned containers. An inoperable machine may result in disruption of the retailer's operation, causing him to sort and store the containers manually until the machine is repaired.

Attempts to address these difficulties have centered on providing the vacuum system with a shaker or vibration device to knock off the clinging and caked particles. However, shaking or vibrating the filter only removes particles caked onto the surface of the filter in bulk.

It is desirable to provide the capability of thoroughly cleaning the filter in the vacuum system of a recycling machine to maintain a reliable and efficient operating unit.

SUMMARY OF THE INVENTION

Accordingly, it is an object of the present invention to efficiently densify and store large quantities of recyclable commodities, utilizing suction to convey the densified commodity.

It is a further object of the present invention to provide a machine that can densify and store recyclable commodities while maintaining a filter system that prevents densified commodity from entering the suction device and the atmosphere.

It is an additional object of the present invention to provide a machine that can densify and store large quantities of recyclable commodities and provide a filter cleaning arrangement.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises a commodity densification and storage assembly having a housing with an insert port for receiving a commodity, such as an aluminum can, glass bottle, and PET bottle. The assembly further includes a means for densifying the commodity disposed downstream of the insert port; a storage means for storing the densified commodity; and a pneumatic means for conveying the densified commodity to the storage means. The pneumatic means includes an inlet pipe for receiving the densified commodity from the densifying means. The inlet pipe is in communication with the storage means. The pneumatic means further has a suction means for creating suction and an outlet pipe in communication with the storage means and the suction means. The suction means draws the densified commodity through the inlet pipe to the storage means. Additionally, the pneumatic means includes a filter system for preventing densified commodity from entering the suction means. The filter system includes a filter and a means for storing and delivering a fluid under pressure. The suction means draws air that passes in sequence through the inlet pipe, through the storage means, through a primary filter, and through the cartridge filter in a first direction. The device for storing and delivering fluid under pressure to the cartridge filter causes the introduced fluid to pass through the cartridge filter in a second direction opposite the first direction for cleaning the cartridge filter.

The assembly may also include means for controlling the quantity of the fluid delivered from a reservoir to the filter.

The filter system may include means for triggering the means for storing and delivering fluid to the filter. Further, the triggering means may be triggered by reaching a predetermined commodity count, or time interval.

The invention also comprises a method of densifying and storing a recyclable commodity, comprising the steps of inserting the commodity through insert means into a housing; densifying the commodity; pneumatically conveying the densified commodity for storage; filtering air after being used to convey the densified commodity; and delivering a predetermined quantity of fluid under pressure to a filter in a direction opposite to the usual flow through the filter of the air being used to convey the densified commodity, the fluid under pressure being used to clean the filter.

It is understood that both the foregoing general description and the following detailed description are exemplary and explanatory only, and are not restrictive of the invention as claimed.

BRIEF DESCRIPTION OF THE DRAWINGS

The accompanying drawings, which are incorporated in and constitute a part of the specification illustrate a preferred embodiment of the invention. Together with the description, they serve to explain the objects, advantages and principles of the invention. In the drawings:

FIG. 8 is a perspective view of the second sensor means for determining the composition of a commodity showing a coil for sensing a metal can;

FIG. 9 is a side view of the separation means of the present invention;

DESCRIPTION OF THE PREFERRED EMBODIMENTS

Reference will now be made in detail to the present preferred embodiments of the invention, as illustrated in the accompanying drawings.

Figure 11:
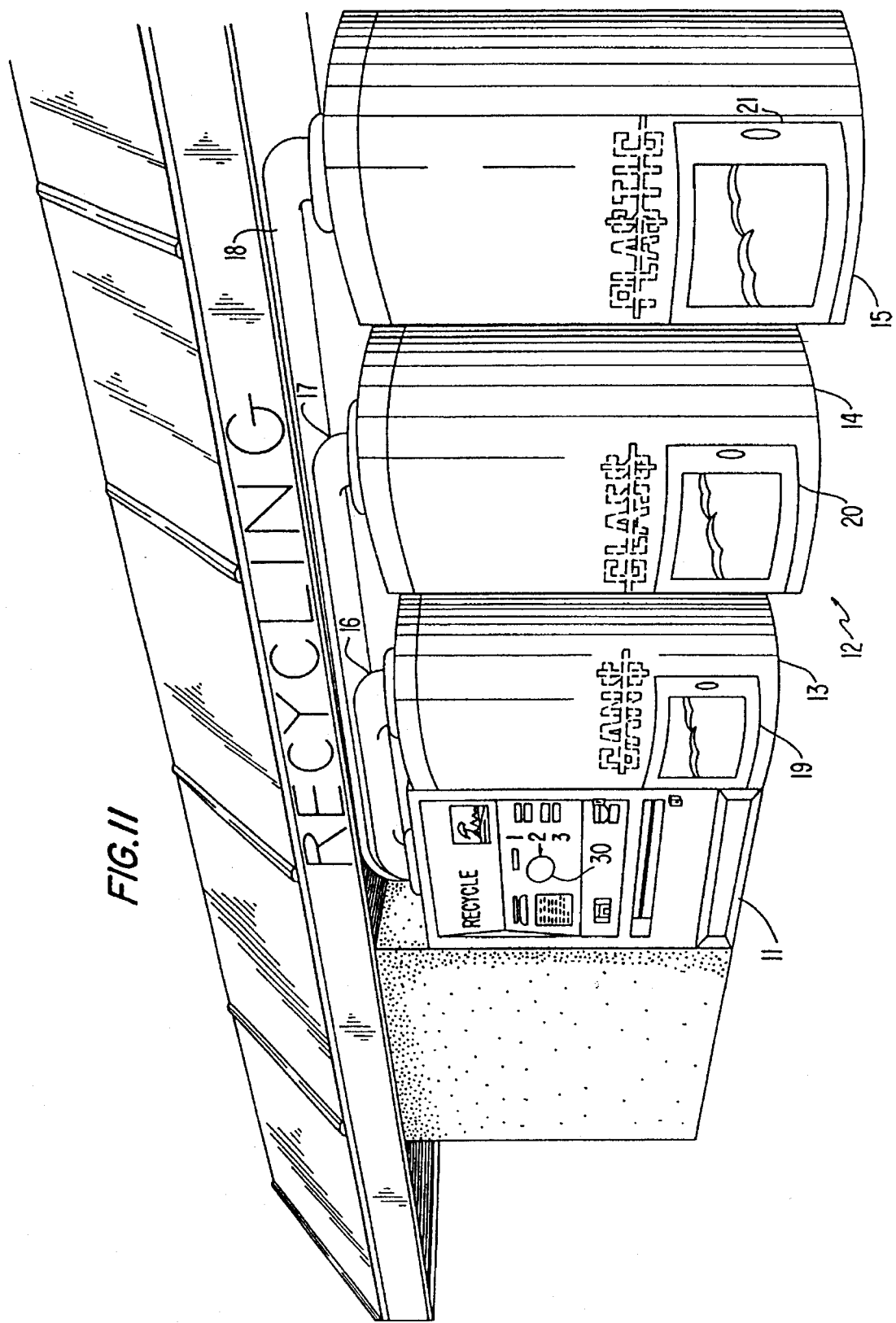
FIG. 11 is a perspective view of an embodiment of the commodity collection, densification and storage assembly of the present invention showing separate storage means for storing the densified commodity according to its composition.
Figure 12:
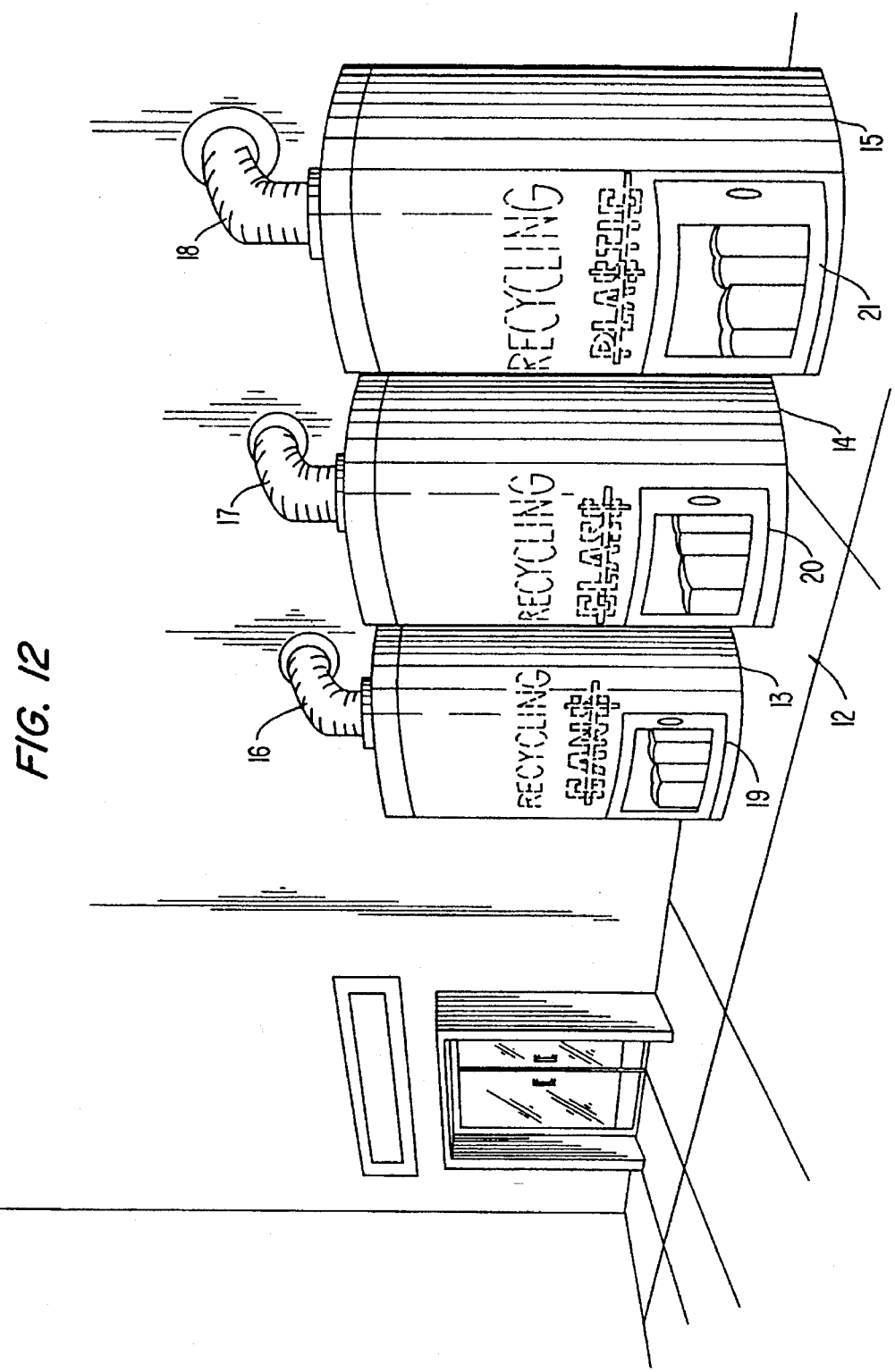
FIG. 12 is a perspective view of an alternate embodiment of the storage means for the commodity collection, densification and storage assembly of the present invention showing storage means remotely located from the housing.

In accordance with the present invention, a commodity collection, densification and storage assembly includes a housing and storage means for storing densified commodities according to composition. As broadly depicted in FIG. 11, each commodity collection, densification and storage assembly includes a housing 11, and a storage means 12. Storage means 12, as broadly described herein, may comprise, for example, a plurality of storage bins 13, 14 and 15 for storing densified commodities separately according to the composition of the commodity. A consumer may insert a plurality of recyclable commodities of different compositions into the housing 11. As shown in FIGS. 11 and 12, each storage bin may receive one type of densified commodity. For example, storage bin 13 stores densified aluminum, storage bin 14 stores densified glass, and storage bin 15 stores densified plastic. Alternately, one storage bin containing a number of storage compartments with each compartment storing a different densified commodity may be provided. Further, additional storage bins or compartments may be provided for storing densified commodities of the same composition but of a different color. For example, a separate bin or compartment may be provided for storing clear glass, green glass, and brown glass, or for storing clear plastic, and colored plastic.

As shown in FIG. 12, the storage bins 13, 14 and 15 may be located remotely from the housing 11. Such an arrangement is beneficial to a retailer lacking space for housing 11 and storage bins 13, 14 and 15 all in one location. Each of the storage bins 13, 14 and 15 is connected to the housing 11 by conduits 16, 17 and 18, respectively, which carry the densified commodity from the housing to the bins. Preferably, each of the storage bins 13, 14 and 15 includes an access opening 19, 20 and 21, respectively, for removing densified commodities from the storage bin.

Alternatively, a plurality of housings 11 may be provided together in one location to allow a number of consumers to simultaneously insert recyclable commodities. Where a plurality of housings 11 are provided, each may be attached to a separate set of storage bins 13, 14, 15 or each housing may be attached to the same set of storage bins with a given bin receiving all of one type of recyclable commodity from all of the housings.

Figure 3:
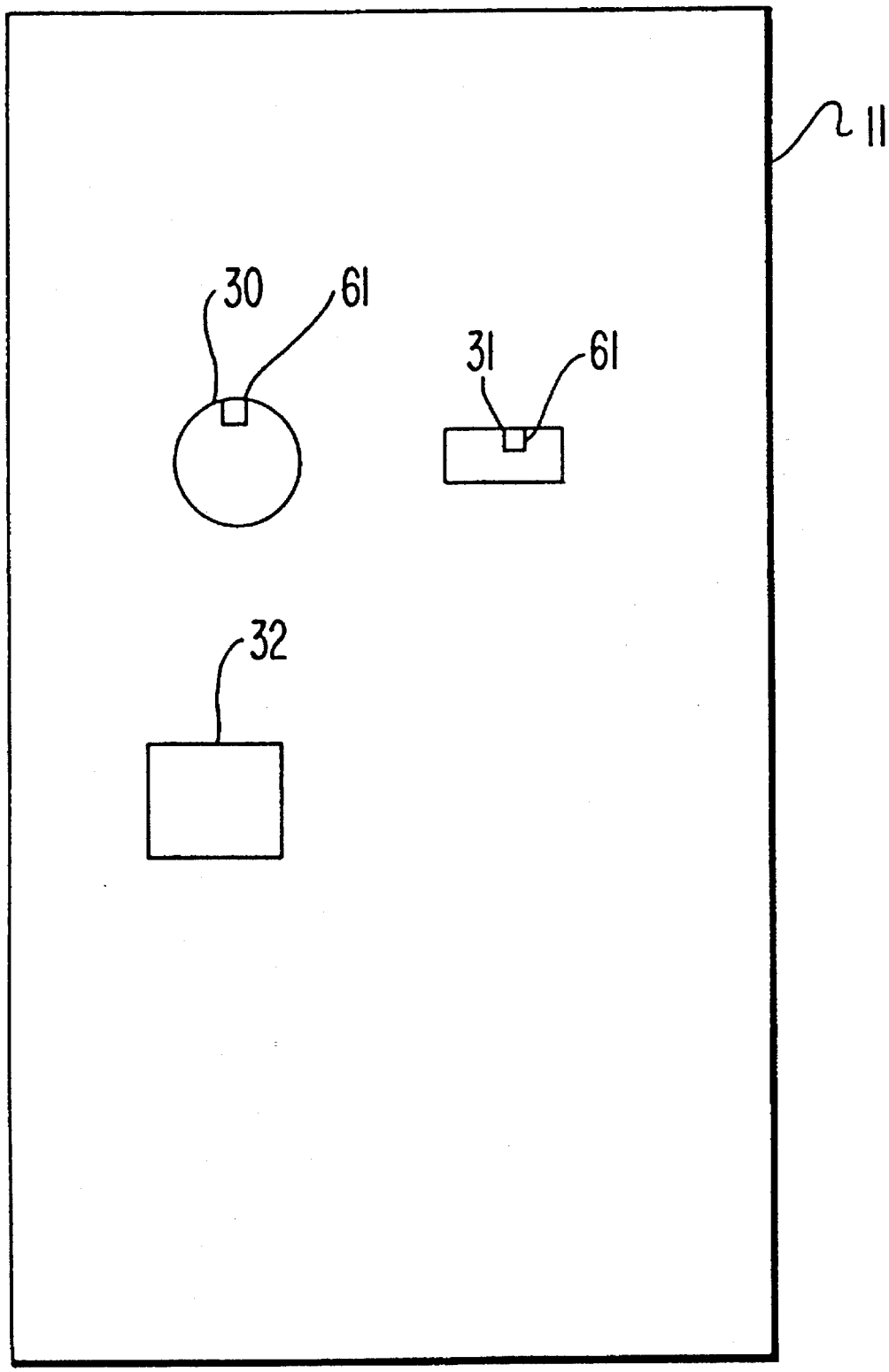
FIG. 3 is a partial front view of a commodity collection, densification and storage assembly of the present invention showing a housing having insert means comprising a generally rectangular insert port and a generally round insert port.

In accordance with the invention, the commodity collection, densification and storage assembly includes insert means in the housing for receiving a commodity. As broadly embodied in FIG. 3, insert means may comprise, for example, a generally round insert port 30 for receiving generally cylindrical commodities. The assembly may also include, as shown in FIG. 3, a generally rectangular insert port 31 for receiving generally rectangular commodities. The assembly may include either port 30 or 31 or both together without departing from the scope of the invention. Generally cylindrical commodities include, for example, glass and plastic bottles and metal cans. Generally rectangular commodities include, for example, a cardboard box, most often used to contain noncarbonated drinks.

Figure 2:
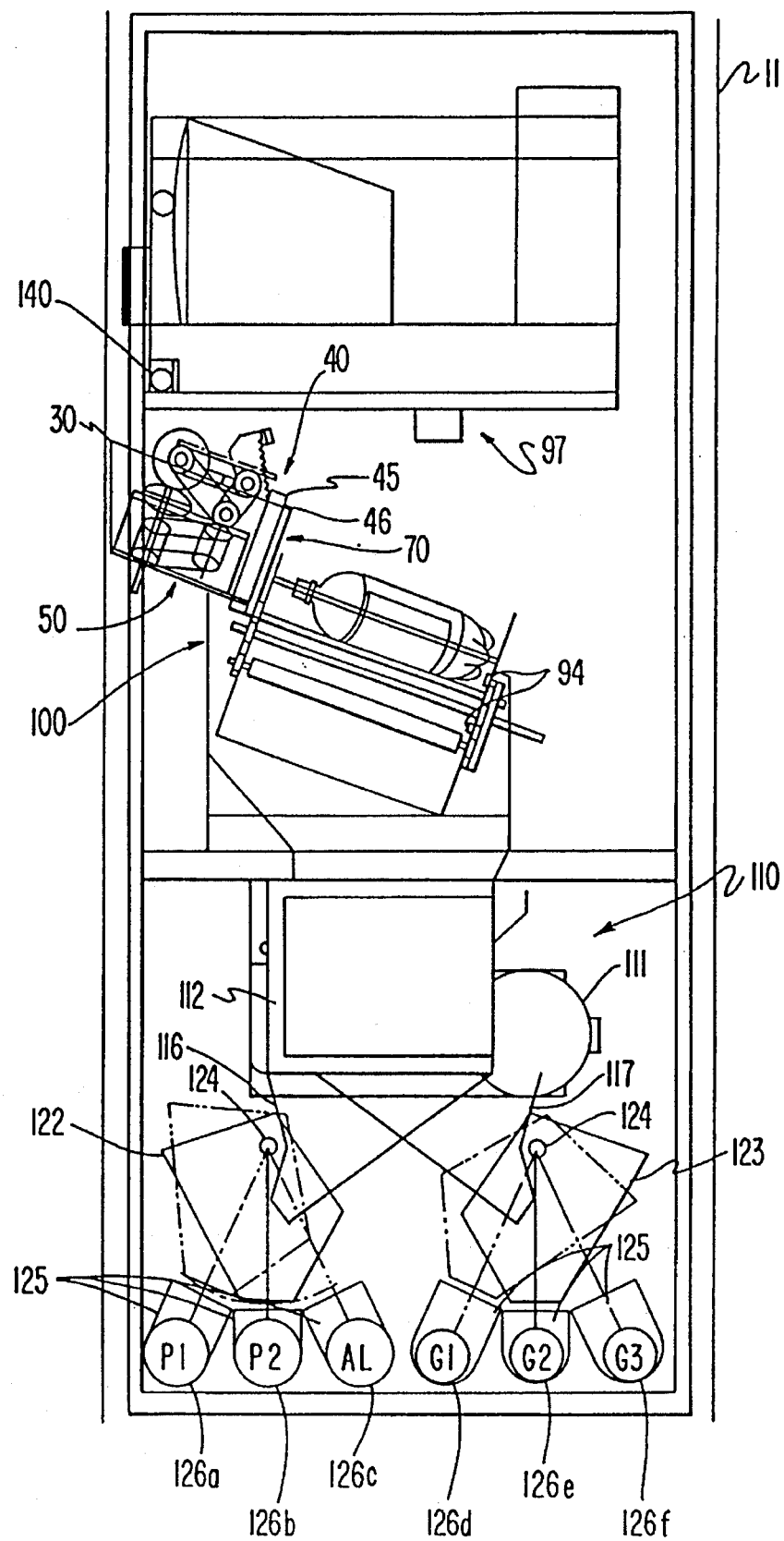
FIG. 2 is a side cutaway view of the commodity collection, densification and storage assembly of the present invention as shown in FIG. 1.
Figure 4:
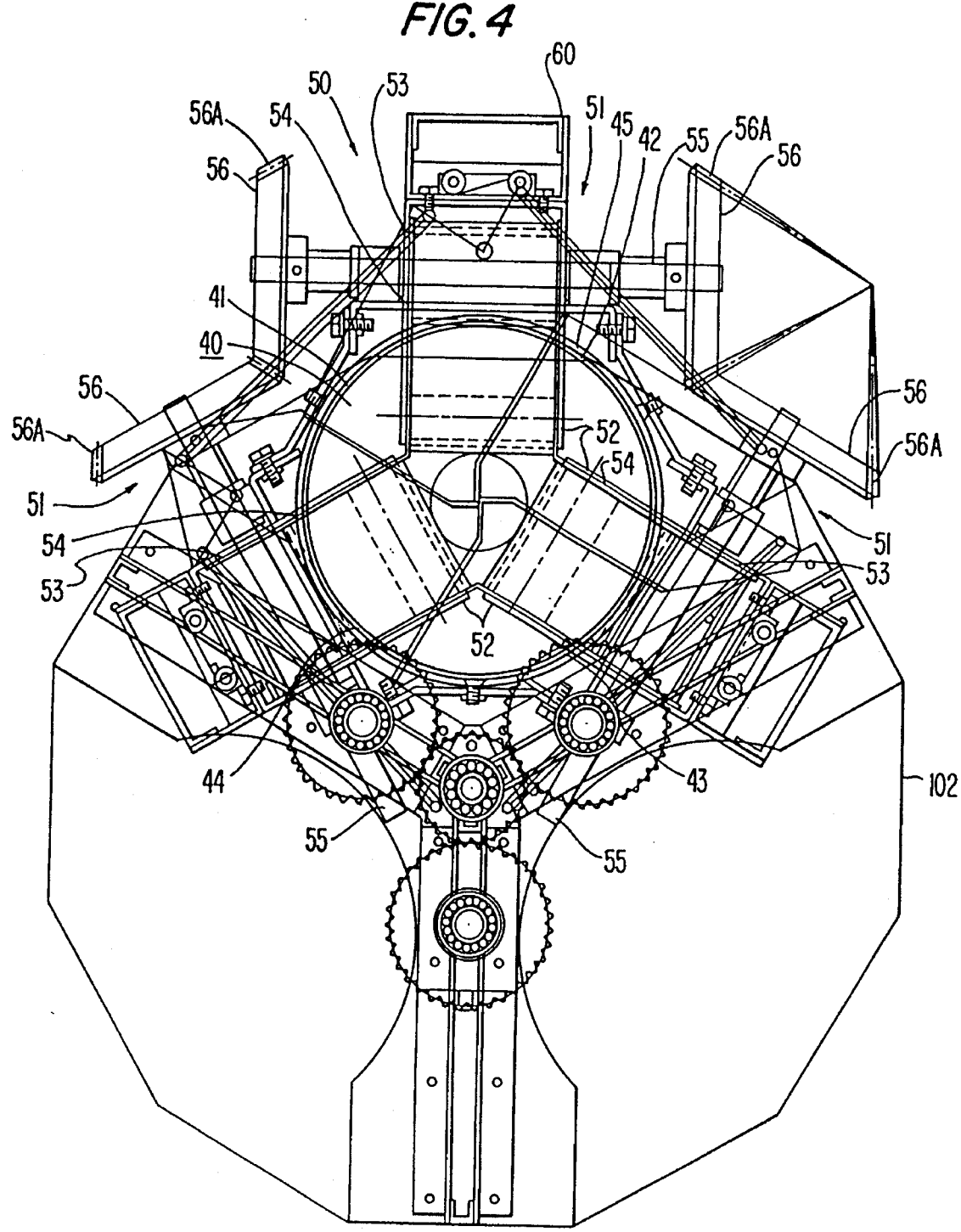
FIG. 4 is a front view of the commodity collection, densification and storage assembly of the present invention showing an enlarged view of the insert means, gate means, and intake means.
Figure 5:
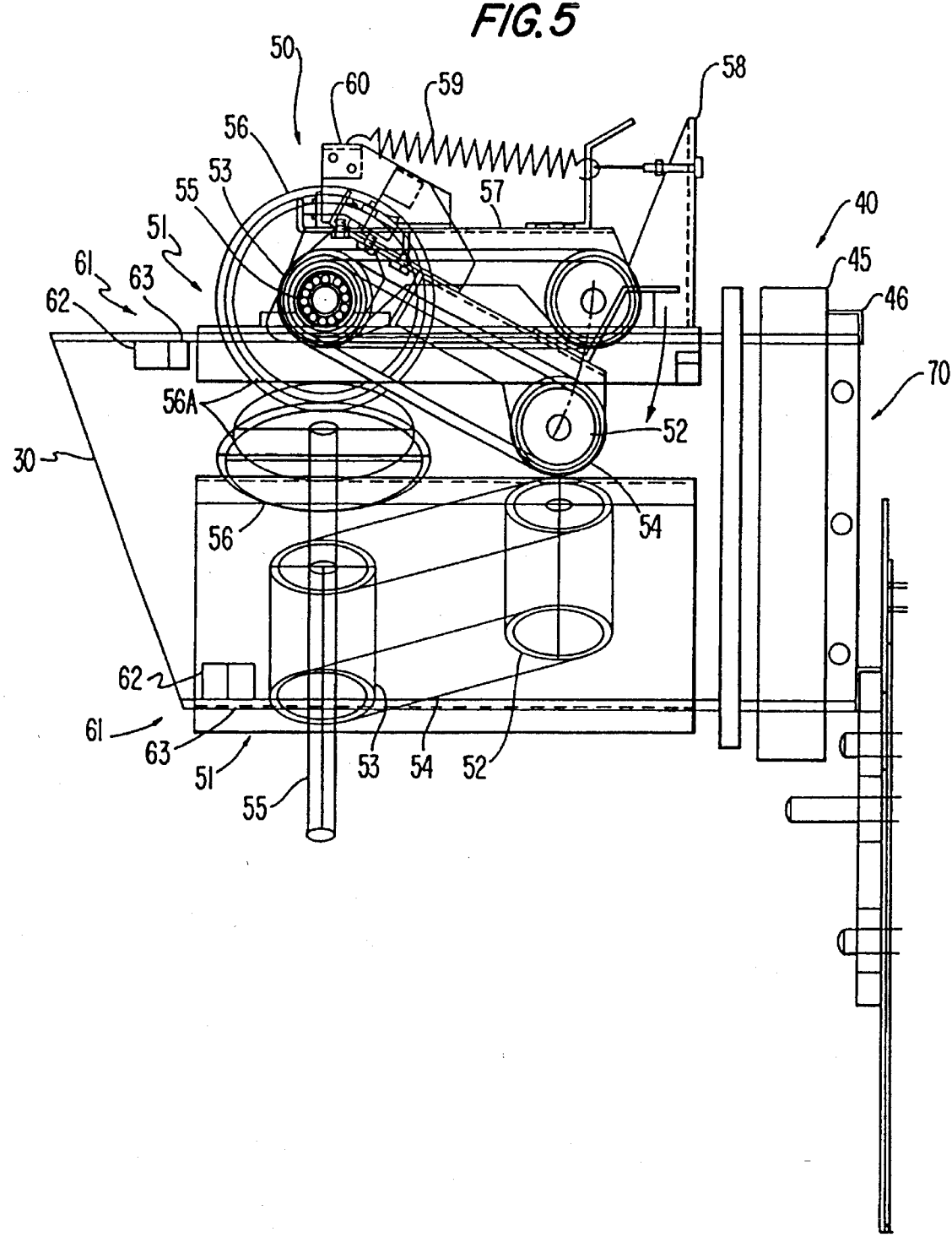
FIG. 5 is a side view of the insert means, gate means, intake means, and first and second sensor means of the present invention.

In accordance with the invention, gate means are provided adjacent the insert means movable between an open and a closed position, for allowing the commodity to pass therethrough into the housing. Gate means may include a mechanical gate mechanism or an "iris." FIGS. 2, 4 and 5 show a gate mechanism 40 adjacent to the insert port 30. The gate mechanism 40 is movable between an open and closed position, for allowing the commodity to pass therethrough into the housing 11. The gate mechanism 40 is shown in the closed position in FIG. 4.

The gate mechanism 40, as embodied in FIG. 4, comprises a plurality of movable plates 41–44 held within a ring 45. The plates 41–44 are opened by a solenoid switch (not shown) against the force of a spring (not shown) to allow an inserted commodity to pass through the ring 45 and further into the housing 11. Once the inserted commodity passes through the gate mechanism 40, the solenoid switch is turned off. The plates 41–44 thus return to the closed position of FIG. 4 by the spring force. The plates 41–44 preferably return to the closed position within milliseconds after the solenoid valve is turned off.

More preferably, the plates 41–44 are opened by a motor to allow an inserted commodity to pass through ring 45 and further into the housing 11. Once the inserted commodity passes through the gate mechanism 40, the motor returns the plates 41–44 to the closed position of FIG. 4.

In accordance with the invention, intake means are provided for drawing the commodity from the insert means through the gate means. Intake means may include belts, a roller assembly, or the like. As broadly embodied in FIGS. 1, 2, 4, and 5, the intake means comprises an intake device 50 including at least one roller which rotates in a direction to draw an inserted commodity into the housing 11 and through the gate means 40. Preferably, the intake device 50 may also advantageously include at least one roller assembly 51 including a pair of rollers 52, 53 and a rotatable belt 54 disposed therebetween. Each roller 53 is mounted on a rotatable shaft 55 for driving the rotation of the roller. As the shaft 55 of each roller assembly 51 is driven, the attached roller 53 rotates causing the corresponding belt 54 to rotate, thereby causing roller 52 to rotate. The rotation of the belt 54 about the rollers 52, 53 draws the inserted commodity into the housing 11.

Preferably, a gear 56 is mounted on at least one end of each shaft 55. Each of the gears 56 mounted on a shaft 55 meshes with another gear 56 mounted on another shaft 55. Therefore, any rotation of one shaft 55 causes the rotation of the other shafts due to the interlocking gears 56. Each gear 56 has a bevelled edge 56a for contacting the beveled edge 56a of an adjacent gear 56. The bevel angle of the bevelled edge 56a may vary with the number and placement of roller assemblies 51 within the housing 11.

Figure 1:
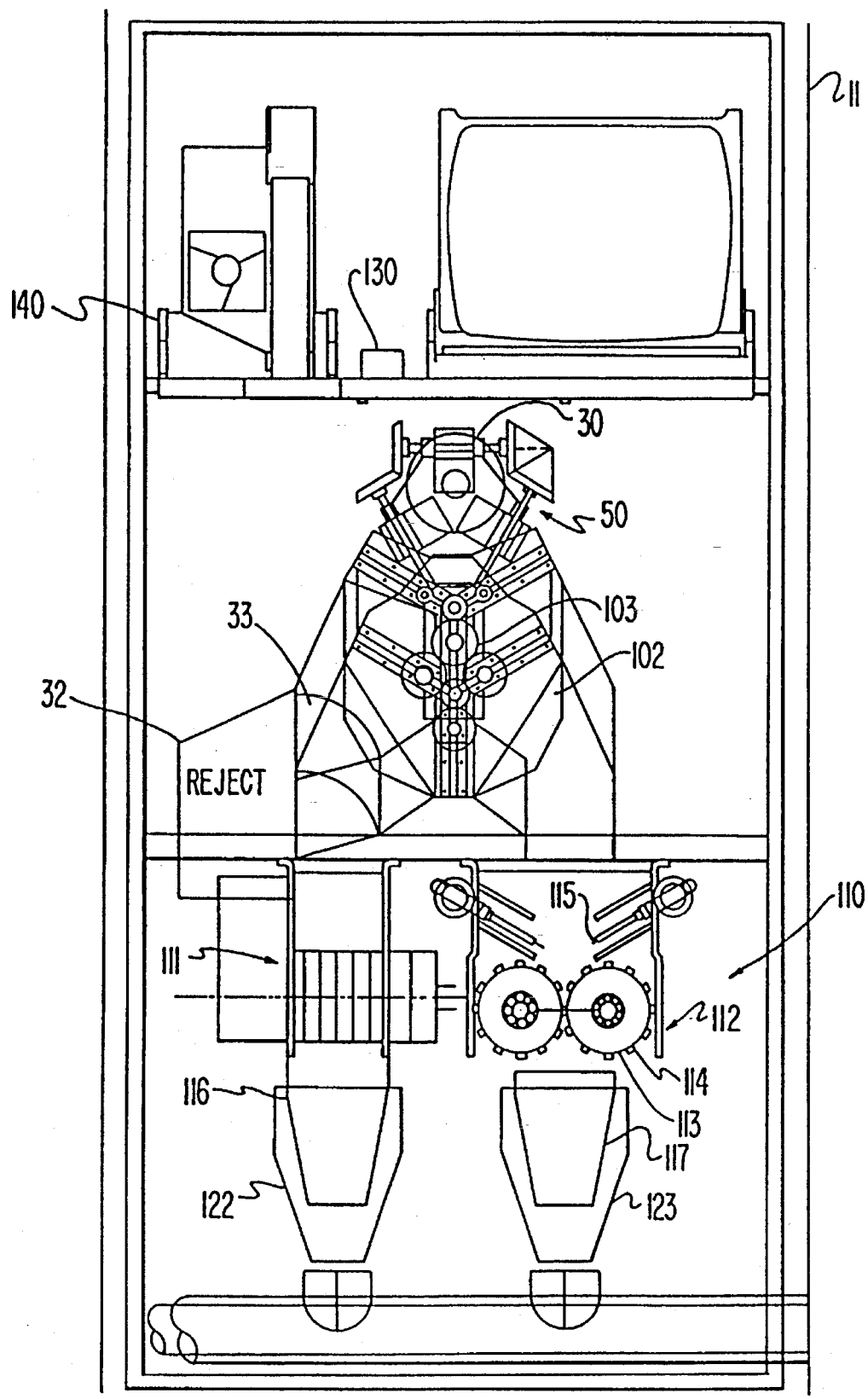
FIG. 1 is a front cutaway view of the commodity collection, densification and storage assembly of the present invention showing various elements of the assembly arranged within the housing.

As shown in FIGS. 1, 4 and 5, the intake device 50 preferably comprises three roller assemblies 51 and therefore three shafts 55. The gear 56 may be disposed at either or both ends of the shafts 55 so long as all of the shafts are driven together simultaneously. As best shown in FIG. 4, the uppermost shaft 55 may have two gears 56, one each for contacting the gear of the two LAW OFFICES lower shafts, while the lower shafts have only one gear. Alternatively, each shaft 55 may have two gears 56 thereby placing each shaft in rotational contact with the other two. While the intake device 50 is shown to include three roller assemblies 51, the present invention is not limited to such, and a device with a different number of roller assemblies is still within the scope of the present invention.

As shown in FIG. 5, the intake device 50 is adjustable to conform to the size of the inserted commodity. Each roller 52 is rotatably mounted on an arm 57 which is pivotally mounted so as to be partially rotatable about, but not fixed to, the shaft 55. As shown in FIG. 5, each roller assembly 51 includes a post 58 fixed to the housing 11 to which a spring 59 is attached. The spring 59 is also attached to a crosspiece 60 fixed to the arm 57. The spring 59 is loaded in tension thereby urging the arm 57 to rotate about the shaft 55 in the direction of arrow F, as shown in FIG. 5. The spring 59 thus causes the rollers 52 to come together in the center of the intake device 50 as shown in FIG. 4. However, each arm 57 of the roller assembly 51 is movable in the direction opposite to the arrow F in FIG. 5 in order to allow larger commodities to pass into the housing.

Alternatively, in accordance with the invention, the intake device 50 may include a roller or wheel assembly. A preferred intake device 50 includes three sets of rollers aligned along the bottom of the intake device 50 to provide a path for an inserted commodity to be drawn into the housing 11 and through the gate means 40. A rubber wheel is mounted on a rotatable shaft along the top of the intake device 50. The wheel is on a pivot assembly and adjusts to conform to the size of the inserted commodity. The rotating wheel pivots down until it contacts the commodity. The commodity is forced between the rollers at the bottom of intake device 50 and the wheel. The rotating wheel draws the commodity through the gate. The alternative advantageously provides for faster indexing of the commodity.

Preferably, the intake device 50 is activated by an optical sensor or acoustic device for detecting the presence of an object within the insert port 30. As broadly embodied herein and shown in FIGS. 3 and 5, an optical sensor or more particularly an infrared sensor device 61 senses the presence of an object inserted into either the round insert port 30 or rectangular insert port 31.

Preferably, the optical sensor device 61 comprises at least one infrared sensor including an emitter 62 and a receiver 63 disposed within each insert port 30, 31. When an object is placed into the insert port 30, 31, the infrared light emitted by each emitter 62 is reflected off the object and received by the receivers 63. The infrared sensor device 61 preferably includes a plurality of such infrared sensors for improved sensing.

When a commodity is inserted into the intake device 50, the infrared light emitted by the emitters 62 reflects off the object and is received by at least one of the receivers 63. Upon reception of infrared light, a microprocessor (not shown) activates a motor (not shown) which drives the shafts 55 causing the belts 54 to rotate in a direction to draw the inserted commodity into the machine. The electric motor may be rotationally connected to one of the shafts 55, or a plurality of electric motors may be provided, each motor being attached to a different shaft 55. The electric motor or motors are switched off after a predetermined period of time sufficient for the intake device 50 to draw the inserted commodity through the gate mechanism 40.

In accordance with the invention, a first sensor means is provided for sensing the presence of an object in the gate means. As broadly embodied herein and as shown in FIGS. 2 and 4, the first sensor means comprises a first sensor device 46 for detecting the position of the plates 41–44 after the solenoid valve (not shown) has been shut off thereby releasing the plates to return to the closed position, as shown in FIG. 4. The spring (not shown) urges the plates 41–44 toward the closed position.

Preferably, the spring will cause the plates 41–44 to return from the opened to the closed position within milliseconds. If, the plates 41–44 have not returned to the closed position milliseconds after the solenoid valve has been shut off, the solenoid valve is reactivated thereby reopening the gate mechanism 40. The intake device 50, including the roller assemblies 51, and other moving parts within the housing 11 are also shut off. In operation, the reopening of the gate mechanism 40 and stopping of the intake device 50, prevents clogging and damage to the intake device and gate mechanism upon insertion of inappropriate objects. More importantly, injuries are prevented to consumers who either intentionally or accidentally stick a hand into the device, possibly getting caught by a watch or ring. A message may then be given to the consumer explaining that the gate means should be cleared, and only recyclable commodities should be inserted into the intake device 50. Thus, the opening and closing of an outer door by the consumer in order to effect repeated insertion of commodities is advantageously avoided by the present invention. As previously stated, an alternative embodiment to the solenoid valve and spring arrangement utilizes a motor to open and close the plates 41–44.

In accordance with the invention, a second sensor means is provided for verifying whether the inserted commodity is a participating commodity and for determining a composition of the commodity. As broadly embodied herein, the second sensor means comprises a second sensing device 70 adjacent the gate mechanism 40, as shown in FIGS. 2 and 5, for determining a composition of the commodity. In order to determine whether an inserted commodity is a "participating" commodity, as broadly embodied herein and as shown in FIGS. 2 and 9, the second sensor means further comprises a laser scanning device 97 attached to the housing 11 for detecting the presence of and reading a barcode (UPC).

As disclosed in U.S. Pat. No. 4,784,251, owned by Applicants' assignee, the description of which is incorporated herein by reference, the laser scanning device 97 may include a low power laser emitter 98 and a laser reader 99. The inserted commodity C is scanned while positioned atop two of the rods 101 and the shaft 103 of the separation device 100, which will be described later in detail. The laser emitter 98 of the laser scanning device 97 projects a light pattern across the surface of the inserted commodity which is received by the laser reader 99 thereby reading the barcode. The rods 101 and shaft 103 are rotatable to also rotate the inserted commodity to ensure that the laser scanning device 97 reads the barcode.

If the laser scanning device 97 does not detect a barcode on the inserted commodity, the commodity is rejected and is therefore a "nonparticipating commodity" which is returned to the consumer through the reject port 32. Further, if the laser scanning device 97 does detect and read a barcode but cannot match that barcode with a predetermined list of container barcodes, the inserted commodity is also rejected as a nonparticipating commodity.

The laser scanning device 97 rejects commodities as nonparticipating if a barcode is not found in order to reject any nonrecyclable object which might be inserted into the assembly, thereby preventing mixture of recyclable commodities with waste material or damage to the assembly. The laser scanning device 97 also rejects objects without a barcode or with barcodes that cannot be matched because retailers and distributors of the containers are compensated for recycling and billed for the scrap value of the material through use of information obtained by reading the barcode. The proper credits and debits cannot be made if a barcode cannot be read and matched. Thus, a number of barcodes are placed in the memory of the laser scanning device 97 so that various different containers may be accepted.

If the laser scanning device 97 does detect, read and match a barcode, the commodity is a "participating commodity," and the commodity is densified and stored according to other information obtained by the second sensor device 70.

If two insert ports 30, 31 are provided, a second corresponding set of an intake device 50, a gate mechanism 40, a first sensor device 46, and a laser scanning device 97 may be provided adjacent the inset port 31 for processing the inserted cardboard boxes. However, after reading the barcode, participating cardboard commodities may be fed by a separation wheel 100, described in detail below, directly to densification means since no further segregation by color or composition is required. The cardboard densifying device may comprise the shredding mechanism 111 discussed in detail below, or may be a separately provided shredding mechanism.

Figure 6A:
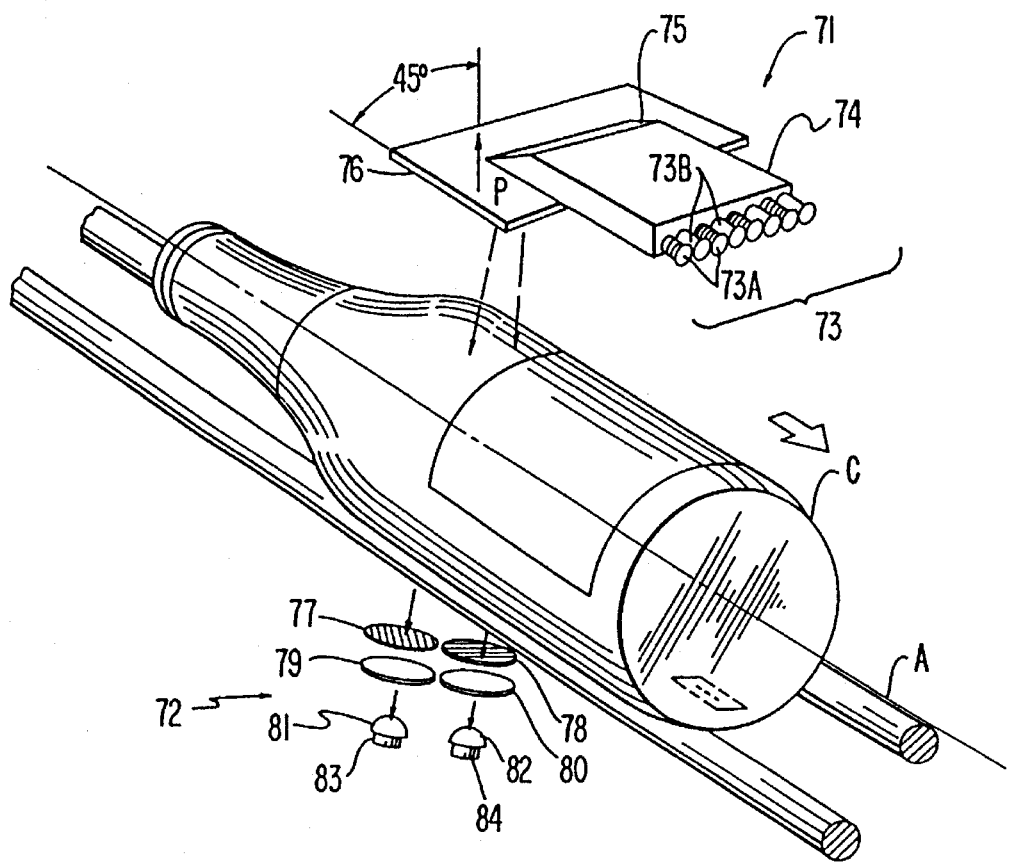
FIG. 6A is a perspective view depicting operation of the second sensor means for determining a composition and color of the inserted commodity.
Figure 6B:
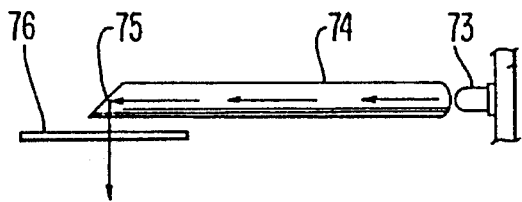
FIG. 6B is a side view of the second sensor means of FIG. 6A showing the path of the sensing light beam through the optical coupler.
Figure 6C:
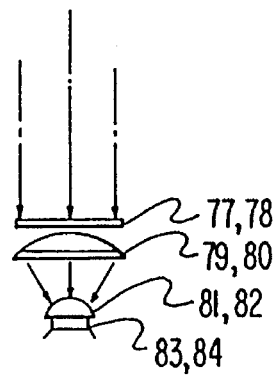
FIG. 6C is a side view of the second sensor means as in FIG. 6A showing the path of the sensing light beam through the lenses to the photodiode.

Preferably, the second sensor means senses a commodity composed of glass or plastic and further senses a color of the commodity. As broadly embodied herein and as shown in FIGS. 6A, 6B, and 6C, the second sensor device 70 comprises means for sensing the composition and color of glass and plastic commodities. Such a sensing device is disclosed in U.S. Pat. No. 4,919,534, owned by Applicants' assignee, the description of which is incorporated herein by reference. In such a device, an inserted commodity C passes between a light source assembly 71 and a light analyzer assembly 72. The light source assembly 71 includes a plurality of light emitting diodes 73 disposed opposite an optical coupler 74 made of optical plastic. The diodes 73 include two different types 73a, 73b, which emit two different wavelengths of light and are spaced alternately across the optical coupler 74. Inside the optical coupler 74, the light from the diodes 73a, 73b is diffused from that of discrete points into a continuous band of light having different wavelengths through a reflection on surface 75. The reflected light passes through a polarizing plate 76 which polarizes the light in the direction shown by arrow P in FIG. 6A. For best detection of PET and exclusion of vinyl, the polarizing direction of plate 76 should be preferably offset 45° from the direction of the center axis A of the inserted commodity C.

The light beam then passes through the container C (if the container is at least partially transparent) and is received by the light analyzer assembly 72. The light analyzer assembly 72 includes a parallel polarizer 77 having a polarization direction parallel to that of polarizing plate 76, and a cross polarizer 78 having a polarization direction orthogonal to the polarization direction of the polarizing plate 76. The portions of the light beam emitted by the diodes 73 which pass through the polarizers 77, 78, then pass through converging lenses 79, 80 and field lenses 81, 82 to be received by photodiodes 83, 84.

Through use of a microprocessor (not shown), the second sensor device 70 determines the composition of the commodity C by evaluating whether the polarization of the light passing through the container was changed from the direction P of the polarizing plate 76 thereby allowing light to be received by the photodiode 84 corresponding to the cross polarizer 78. Glass and vinyl containers do not scatter or alter the polarization of light passing through them. Therefore, just as if no container or an opaque object were present, no light passes through the cross polarizer 78 after passing through a glass or vinyl container. PET and polystyrene containers do alter the polarization, therefore light does pass through the cross polarizer 78 after passing through the container C. It is believed that this effect is caused by the molecular structures of the containers and the methods of their manufacture.

The second sensor device 70 determines the color of the inserted commodity by determining how much of each wavelength of light from the different colored diodes 73a, 73b was absorbed in passing through the commodity. Two different photodiodes 83, 84 are required for color sensing because sensing the color of both scattering and nonscattering containers must be performed after the light passes through the polarizers 77, 78.

Alternately, instead of different colored diodes 73a, 73b, white light could be generated and then filtered to provide varying wavelengths of light to perform the color sensing via a separate mechanism. Therefore, for composition sensing, only one color diode would be necessary in the above light source assembly 71. Further, only one photodiode 84 and the cross polarizing plate 78 are required for composition sensing.

Opaque commodities may be handled in a similar manner as discussed above. However, reflective optical waves, preferably within the visible spectrum, would be used to determine commodity color. This alternative measures the light reflected off of the commodity opposed to the light passing through the commodity.

Figure 7A:
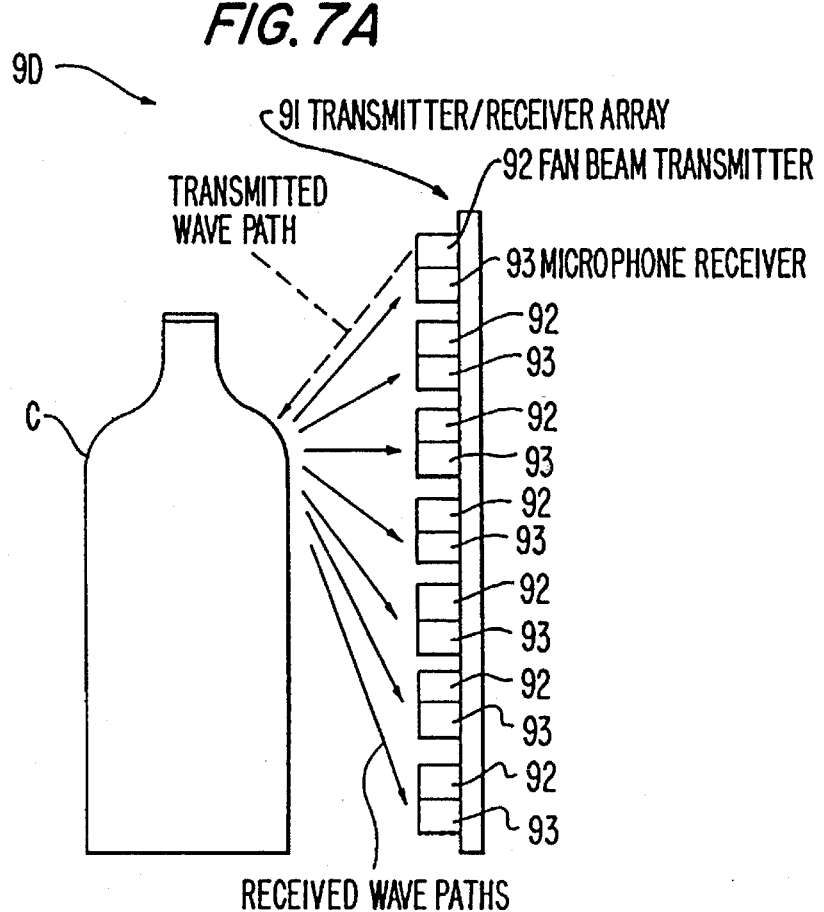
FIG. 7A is a diagrammatic side view of an optional device for use with the second sensor means, for determining the shape of an inserted commodity showing transmitted and received wave signal paths.
Figure 7B:
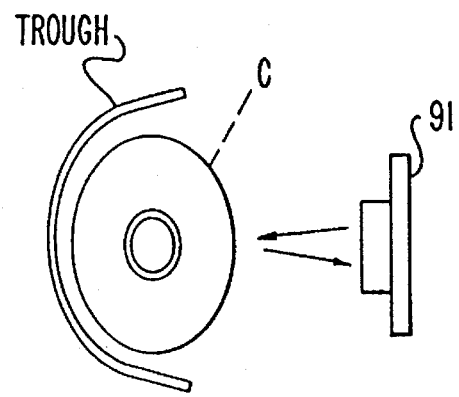
FIG. 7B is a top view of the optional device for use with the second sensor means as in FIG. 7A showing the arrangement of the inserted commodity and the transmitter/receiver array.

As an option, the second sensor means may include a mechanism for sensing the shape of a commodity. As broadly embodied herein and as shown in FIGS. 7A, 7B and 7C, second sensor device 70 may further include an acoustic measurement device 90 for sensing the shape of an inserted commodity C. Such an acoustic measurement device 90 is disclosed in U.S. Pat. No. 5,068,835, owned by Applicants' assignee, the description of which is incorporated herein by reference. The acoustic measurement device may include a transmitter/receiver array 91 including a plurality of pairs of fan beam transmitters 92 and microphone receivers 93. The transmitters 92 transmit a high frequency ultrasonic signal, preferably with a frequency of approximately 50 kHZ and a wavelength of approximately 0.27 inches. The receivers 93 measure the phase of the reflected signals from the transmitters 92. A microprocessor compares the received data to precalculated reference data corresponding to various different containers in order to recognize the shape of the container.

An alternative embodiment for the mechanism for sensing the shape of a commodity uses an optical sensor. The optical sensor is preferably a CCD array that senses a plurality of pixel locations. The optical sensor senses the commodity from one or more directions to determine commodity shape.

The second sensor means may also preferably sense a weight of the commodity. As broadly embodied herein and as shown in FIGS. 2 and 9, the second sensor device 70 may include at least one weighing device 94 for sensing the weight of a commodity so that an object above a predetermined weight is returned to the consumer via the reject port 32. The weighing device 94 may comprise at least one compression scale or piston disposed on the end plate 102 of the separation wheel 100, and weighing may be performed either before or after reading of the barcode by the laser scanning device 97. Due to the slant of the separation wheel 102 from the horizontal, commodities passing through the gate mechanism 40 will settle against the weighing device 94. Rejection of overly heavy items prevents passing of full containers or other inappropriate objects to the densification assembly 110 which could result in undesirable mixture of waste with densified commodities and potential need for maintenance of the assembly due to fouling, clogging or damage.

Alternatively, the weighing device 94 may be an electronic weighing device such as a strain gauge. The strain gauge preferably includes a piezoelectric film that flexes under the weight of the commodity. The flexure of the film is used to electronically determine commodity weight.

Preferably, the second sensor means senses a commodity composed of metal. As broadly embodied herein and as shown in FIG. 8, the second sensor device 70 may also include a metal sensor 95 comprising an electrified coil 96 through which the inserted commodity C passes. Such a metal sensor 95 is disclosed in U.S. Pat. No. 5,028,870, owned by applicants' assignee, the description of which is herein incorporated by reference. In the metal sensor 95, a current passes through the coil 96 creating an electromagnetic field. The metal sensor 95 may measure change in phase and amplitude of the electromagnetic field caused by the inserted commodity to differentiate aluminum and steel commodities. The metal sensor 95 may also measure the change in voltage across the coil caused by insertion of the commodity. Steel commodities will cause a change in voltage of much greater magnitude than will aluminum commodities. Plastic or glass commodities will cause virtually no change in voltage. After sensing by the metal sensor 95, aluminum commodities are densified, and steel commodities are returned to the consumer via the reject port 32.

In accordance with the invention, separation means responsive to the second sensor means are provided for separating various commodities according to the determined composition prior to entry into the densification means. After the inserted commodity has been sensed by the second sensor means, it is passed to separation means. As broadly embodied herein and as shown best in FIGS. 2, 4 and 9, the separation means comprises a separation wheel 100 including a plurality of rotatable rods 101 mounted between two end plates 102. The end plates 102 are rotatable around a central axis colinear with the axis of a shaft 103 which is rotatable either independently of or in conjunction with the end plates. Each rod 101 is rotatably supported by a pair of gears 104 secured to each end of the rod. The shaft 103 is rotatably supported by a pair of gears 105 secured to the end of the shaft. Transfer gears (not shown) are rotatably mounted on the end plates 102 to mesh in between the gears 104 and 105 supporting the rods 101 and the shaft 103, respectively. Rollers 106 may be provided about each of the rods 101.

As described above, the second sensor means as broadly embodied herein comprises a laser scanning device 97 which employs the rods 101 and shaft 103 to rotatably support the inserted commodity C. The above-described rotation of the inserted commodity C is accomplished through rotation of the shaft 103 by an electric motor (not shown) while preventing rotation of the end plates 102. The transfer gears and other gears 105 thus cause the rods 101 to rotate in the same direction as the shaft 103. The rotation of the rods 101 and shaft 103 causes the inserted commodity to rotate for reading of a barcode by the laser scanning device 97.

Responsive to the second sensor device 70, the entire separation wheel 100 including the end plates 102 is driven about the shaft 103 in order to separate the various inserted commodities. The separation wheel 100 separates the inserted commodities into a first group of commodities consisting of glass commodities and a second group of commodities consisting of plastic and aluminum commodities for insertion into the densification assembly 110. As best shown in FIG. 1, the separation wheel 100 is rotatable about the shaft 103 in both a clockwise or counter clockwise direction. The separation wheel 100 rotates clockwise 120° responsive to the second sensor device 70 determining that the inserted commodity C atop the wheel is a glass commodity. The separation wheel 100 rotates counter clockwise 120° responsive to the second sensor device 70 determining that the inserted commodity atop the wheel is a plastic or aluminum commodity, or is to be returned to the consumer via the reject port 32 as a nonparticipating commodity or a nonrecyclable commodity.

If the commodity is nonparticipating or nonrecyclable, a movable door 33 blocks the commodity from reaching the densification means and routes it to the reject port 32. If the commodity is plastic or aluminum, the door 33 instead blocks the commodity from reaching the reject port 32 and routes it to the densification means.

In accordance with the invention, densification means are provided for densifying the commodity. As broadly embodied herein, densification means comprises a densification assembly 110 including both a shredding mechanism 111 and a crushing mechanism 112. The shredding mechanism 111 densifies commodities of the second group, namely, the plastic and aluminum commodities received from the separation wheel 100.

The shredding mechanism 111, generally depicted in FIG. 1, is generally well known and, as broadly embodied herein, may comprise a device similar to that disclosed in U.S. Pat. No. 4,784,251, and owned by Applicants' assignee, the description of which is incorporated by reference herein.

Another suitable shredder for shredding aluminum cans and PET bottles comprises a pair of counter-rotating shafts. Mounted on each shaft are a plurality of axially-spaced cutting wheels, having side edges and peripheral teeth. The cutting wheels are spaced apart by cutter spacers from one another on each shaft so as to be interleaved with the cutting wheels on the opposite shaft. PET bottles and aluminum cans descend into the shredder, and are cut into strips between the edges of interleaved wheels, while being simultaneously cut into smaller pieces by the teeth. Preferably, the shredder also includes a plurality of combers which are cutaway so as not to overlap the respective shaft, and the comber spacers, disposed between each pair of wheels. The combers direct the bottles and cans between the cutting teeth. Another embodiment of the shredder uses a stripper instead of a comber. The stripper has a block with metal fingers that ride against the cutter spacers.

The above described shredder 230 is only one embodiment of a shredder for PET bottles and aluminum cans suitable for use with the invention. It will be understood that any shredding device capable of densifying PET bottles or aluminum cans can be used and still fall within the scope of the invention.

The crushing mechanism 112, also generally depicted in FIG. 1, as broadly embodied herein, may comprise the device disclosed in U.S. Pat. No. 4,573,641, owned by Applicants' assignee, the description of which is also incorporated herein by reference. The crushing mechanism 112 densifies commodities of the first group consisting of glass commodities, and generally comprises two rotatable drums 113 which rotate in opposite directions so as to draw glass commodities into the small area between them for crushing. The crushing mechanism 112 may have a plurality of ridges 114 extending outwardly from the drums 113 to facilitate drawing the glass commodities into the area between the drums. The crushing mechanism 112 may also include drive rods 115 disposed above the drums 113 for forcing the glass commodities between the drums. Any suitable means for crushing glass commodities may be provided within the scope of the present invention.

Alternately, the crushing mechanism may include a primary crusher and a secondary crusher, for crushing glass into the smallest possible particles. An alternate crushing device which is suitable for use as a primary glass crusher includes a casing, open at top and bottom, defined by side walls. A plurality of spaced generally rectangular projecting steel members extend from one side wall. A shaft is rotatably mounted parallel to the side wall. Projecting from the periphery of the shaft are at least one line of spaced generally cylindrical steel finger members. The finger members extend a distance from the shaft such that, as the shaft rotates, the finger members pass between the projecting member, without touching the side wall. Additionally, the shaft rotates in a direction such that the finger members pass downward and past the projecting members. The finger members are interleaved and generally aligned with the projecting members as they pass therebetween.

In accordance with the invention, removal means are provided for removing the densified commodity from the densification means to the storage means. As broadly embodied in FIGS. 1 and 2, the removal means comprises a removal device 120 including a sorter assembly 121 for receiving the densified commodities and routing the densified commodities to the storage means 12 responsive to the second sensor device 70 so as to maintain separation of the densified commodities. After the densified commodities pass through the shredding mechanism 111, they fall into a shredded commodity ramp 116. Similarly, the crushed commodities fall from the crushing mechanism 112 into a crushed commodity ramp 117.

The sorter assembly 121 preferably includes first and second chutes 122, 123 for routing the densified commodities from the ramps 116, 117 to the proper place in the storage means 12. The first chute 122 receives shredded commodities from the shredded commodity ramp 116, and the second chute 123 receives crushed commodities from the crushed commodity ramp 117. Each of the first and second chutes 122, 123 is swingable about a pivot 124.

Preferably located adjacent the first and second chutes 122, 123 are a plurality of exit tubes 125, each of which is in communication with one of a plurality of inlet pipes 126a–f in communication with the storage means 12. The first and second chutes 122, 123 are moved pursuant to the second sensor device 70 so that the chutes empty into the inlet pipe 126a–f corresponding to the proper storage location in the storage means 12, thereby maintaining separation of the various densified commodities.

As shown in FIGS. 11 and 12, the storage means 12 preferably includes a segregated storage area for separately storing each predetermined type of densified commodity. In the embodiment illustrated in FIGS. 11 and 12, three storage bins 13, 14 and 15 are connected to the housing 11 by conduits 16, 17 and 18. Any reasonable number of storage bins can be attached to the housing 11 via conduits depending on the amount of separation and number of densified commodities to be separated.

Figure 10:
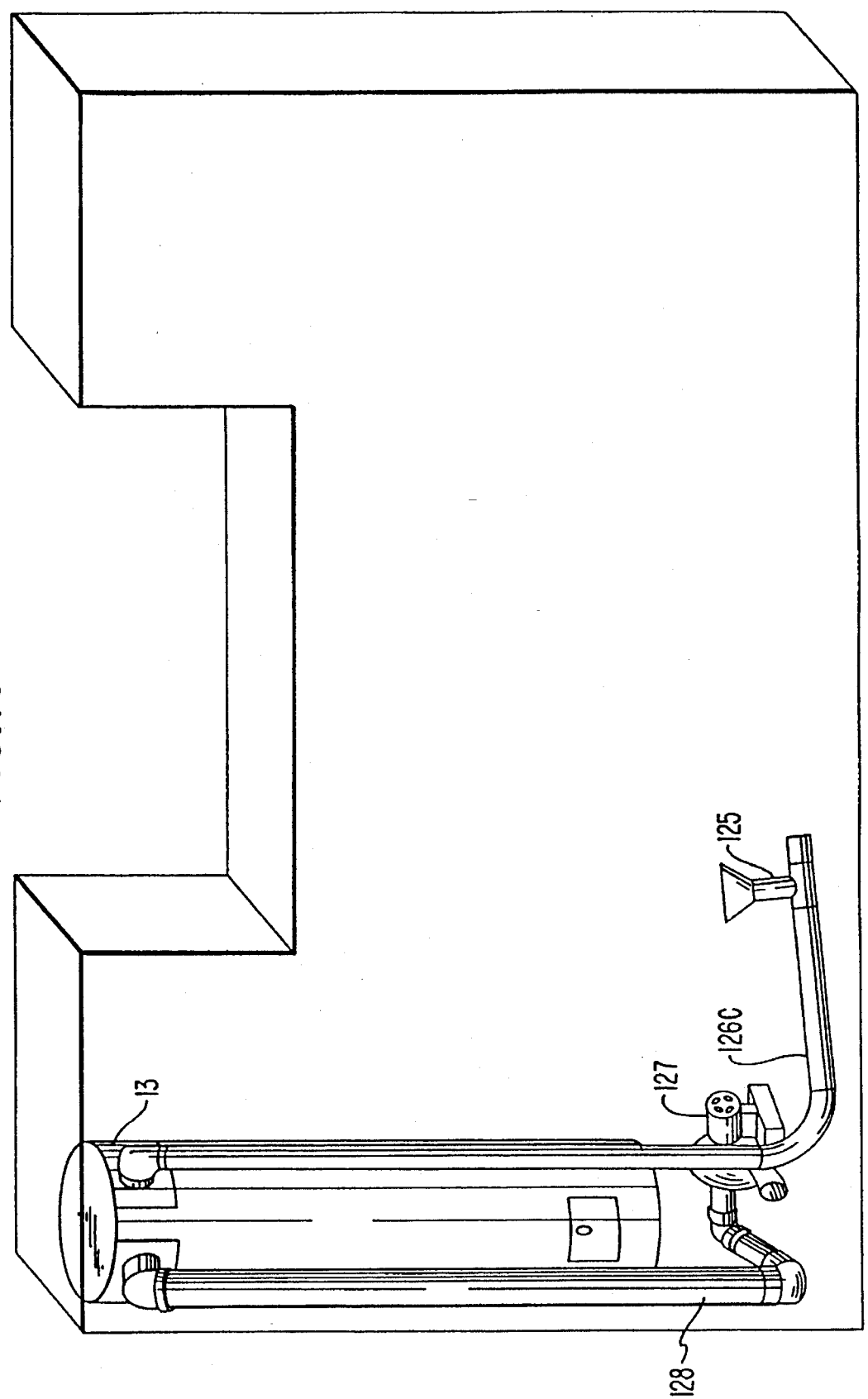
FIG. 10 is a partial perspective view of the pneumatic means for removing densified commodities to the storage means.

As shown in FIG. 10, the removal means preferably includes pneumatic means for removing the densified commodity to the storage means. The operation of such pneumatic means is disclosed in U.S. Pat. No. 5,226,519, owned by Applicants' assignee, the description of which is incorporated herein by reference. As broadly embodied herein, and as shown in FIG. 10, the pneumatic removal means for removing aluminum commodities includes an inlet pipe 126 in communication with the storage bin 13. Shredded aluminum commodities are deposited in the inlet pipe 126 through the exit tube 125 by the first chute 122. A blower 127 draws air from the bin 13 through the outlet pipe 128, thereby drawing air and shredded commodities through the inlet pipe 126 into the bin 13.

Each densified commodity is preferably stored in a separate storage bin or compartment, similar to the one described for receiving shredded metal commodities, each being in communication with the housing by one of the inlet pipes 126a–f and being attached to a blower 127 via an outlet pipe 128. One blower 127 may be operatively connected to a plurality or all of the storage bins, or a separate blower 127 may be provided for each bin.

Figure 14:
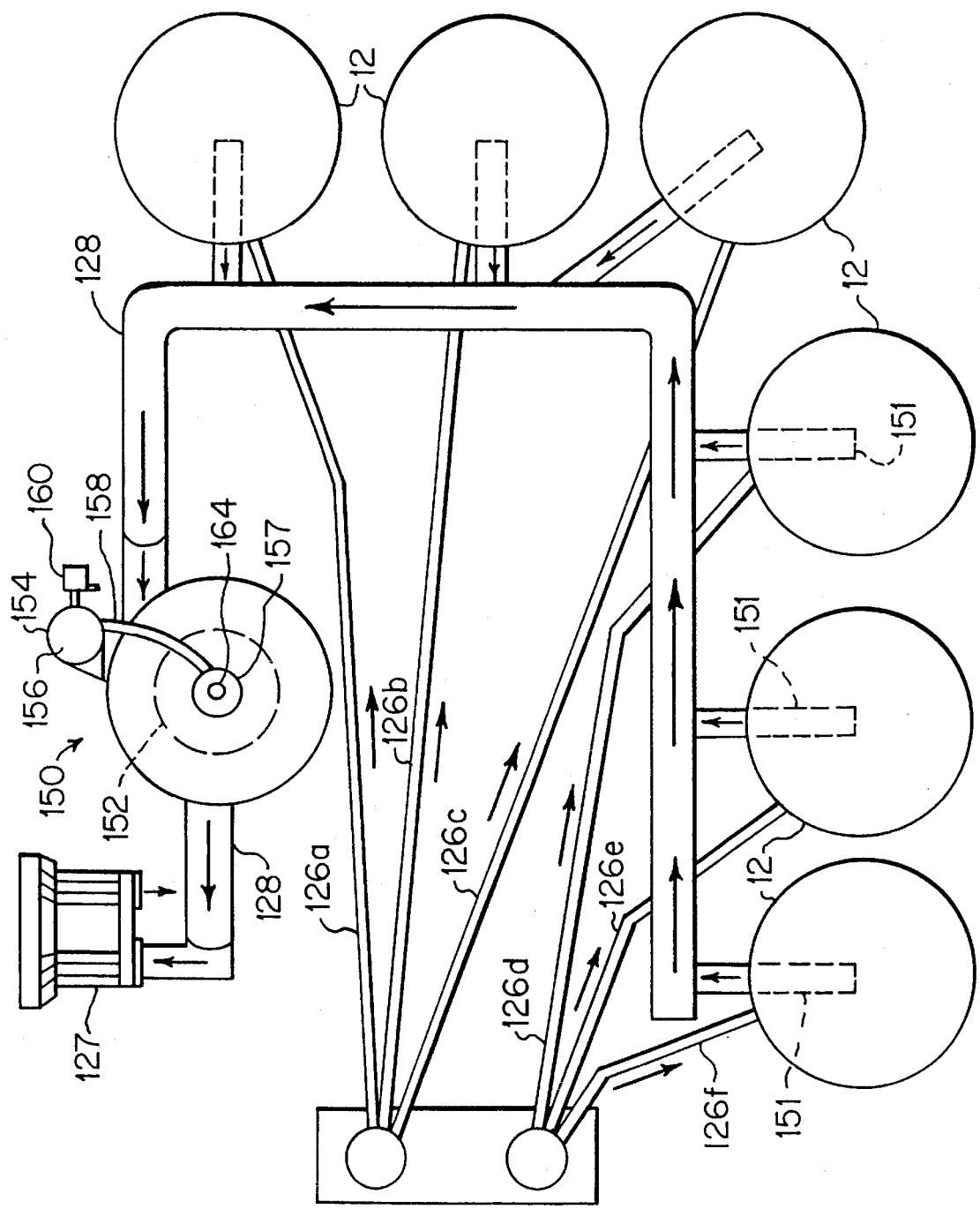
FIG. 14 is a top view of an embodiment of the pneumatic means for conveying densified commodity to the storage means.

As embodied in FIG. 14, one blower 127 is provided for each housing 11 to reduce cost and required space, especially where a plurality of housings are provided in one location. The blower 127 may thus be placed in communication with each of the outlet pipes 128, and is placed in communication with the pipe corresponding to the commodity just densified responsive to the second sensing means 70. Preferably, the pneumatic means for conveying the densified commodity to the storage means includes inlet pipes 126a–f in communication between the housing 11 and storage means 12, and an outlet pipe 128 in communication between the storage means 12 and the blower 127. The blower 127 draws the densified commodity to the storage means 12 through the inlet pipes 126a–f via suction. A primary filter 151 is preferably contained within the storage means 12. The primary filter 151 prevents pieces of densified commodity larger than one-tenth of an inch across from entering outlet pipe 128. A tubular wire mesh arrangement provides the preferred primary filter 151.

Figure 15:
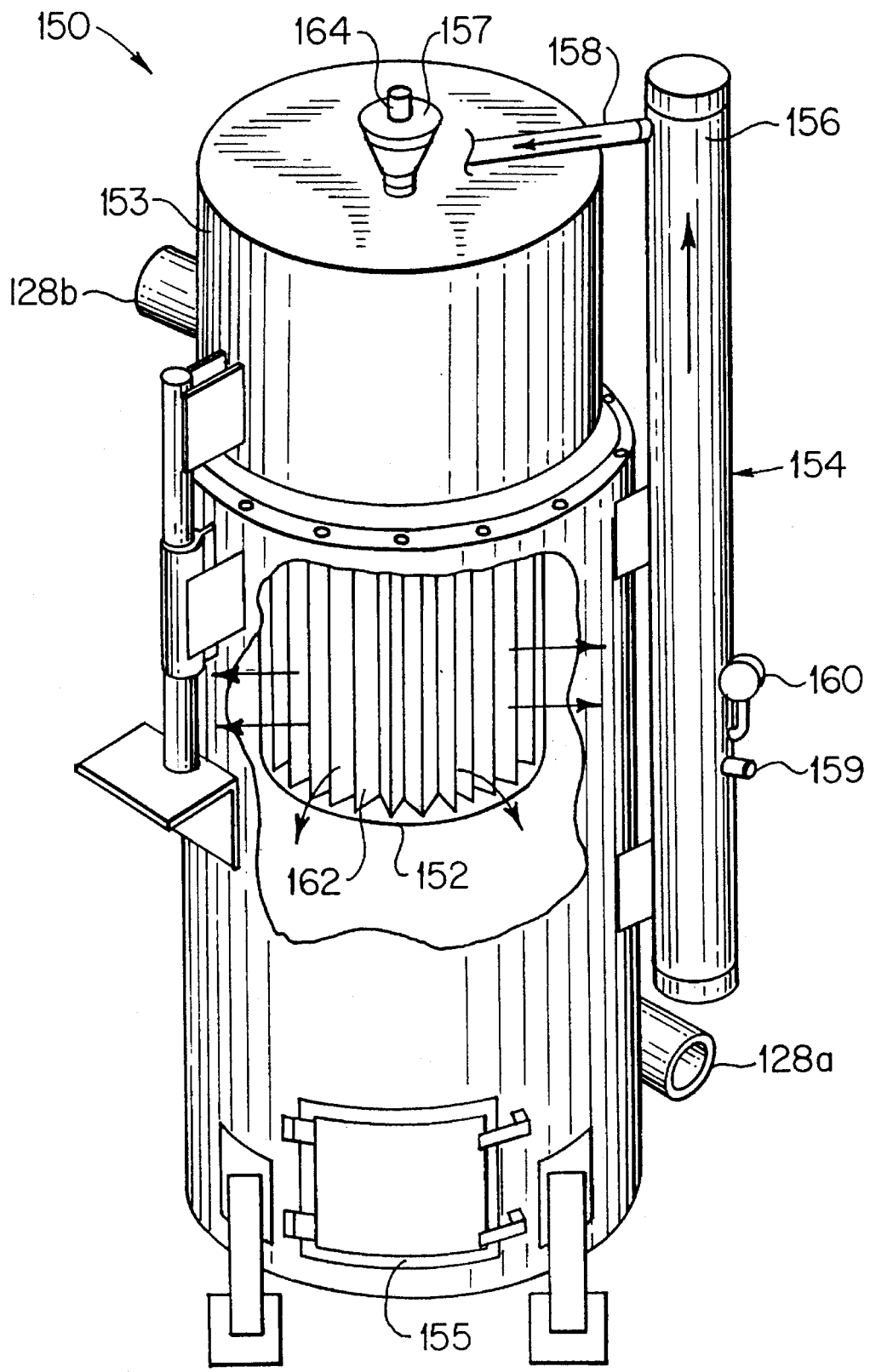
FIG. 15 is a partially cut away perspective view of an embodiment of the air filter system of the pneumatic means.

Additionally, the pneumatic means includes an air filter system 150 having a filter 152 for preventing densified commodity from entering the blower 127. The blower 127 draws air to pass in sequence through the inlet pipe 126, through the storage means 12, through the primary filter 151, and through the filter 152 in a first direction corresponding to the arrows shown in FIG. 14. As shown in FIG. 15, air draw in the first direction through a housing 153 for the filter 152 passes through the outlet pipe 128a from the storage means 12 and the primary filter 151, though the filter 152, and out of housing 153 through the outlet pipe 128b. A means for storing and delivering fluid under pressure 154 to the filter 152 causes the introduced fluid to pass through the filter 152 in a second direction, corresponding to the arrows in FIG. 15, opposite the first direction, for cleaning the filter 152. The pulse of fluid blows particles of densified commodity off the filter 152. The densified commodity then falls to the bottom of the housing 153 for easy removal through door 155. The pulse can work to clean the filter 152 while the vacuum conveying is working without interrupting the material conveying process.

While the preferred filter system 150 shows a single filter 152 oriented within the assembly to prevent densified commodity particles from any of the various storage means 12 from entering the blower 127, it is contemplated within the scope of this invention that numerous filters, locations, and types of filters may be used. For example, each storage means has its own primary filter 151 to filter the air after conveying the densified commodity into the respective storage means. Additionally, a separate filter 152 may be used in connection with one or more of the respective storage means 12. Each of the various densified commodities may have a separate type of filter, differing either in material or configuration, according to the demands placed on the filter by the specific densified commodity.

The single filter arrangement provides easy access for maintenance, and reduces cost and space. However the demands of handling the various densified commodities, especially glass and syrups from beverage containers, provides a hostile environment for a filter. The filter must be cleaned or clogging occurs.

The preferred embodiment of the filter system 150 solves the problem by utilizing the means for storing and delivering pressurized fluid 154 that preferably includes a reservoir 156 for storing fluid and a conduit 158 for delivering fluid from the reservoir 156 through a diaphragm valve 157 to the filter 152. The preferred fluid for delivery from the reservoir 156 is air. The reservoir 156 receives air from a compressor (not shown) via connector 159. The filter system 150 further includes a means 160 for controlling the quantity of the fluid delivered from the reservoir 156 to the filter 152. The preferred means for controlling quantity may be a pressure switch, valve, or adjustment gauge for regulating the amount of air pumped into the reservoir 156, or for only permitting a predetermined amount of air to be released upon reaching a predetermined event.

The filter 152 has a surface 162 for receiving air in the first direction. This surface 162 is preferably made of polytetrafluoroethylene (PTFE) to provide a non-stick surface for the densified commodity, syrup, pieces of paper, labels, and the like coming into contact with the filter 152. A non-stick surface on the filter 152 enhances the capability of the air pulse to blow the densified commodity off of the filter 152, thereby efficiently cleaning the filter. The preferred surface 162 of the filter 152 has a polyester backing to add strength and weight and is further reinforced with wire to prevent tearing by the pulse of air. A preferred filter having the PTFE surface is made by Tetratec Corporation.

The filter system 150 further includes means 164 for triggering delivery of fluid to the filter 152. The triggering means 164 can be triggered, for example, when the commodity collection, densification and storage assembly processes a predetermined number of commodities, when a predetermined length of time passes, or when a predetermined differential air pressure is sensed across the filter while the blower 127 is operating. For example, the reservoir 156 may be triggered upon the assembly densifying X amount of glass commodities, Y amount of aluminum commodities, or Z amount of PET commodities, or every six (6) hours, whichever comes first. Further, a change in suction pressure due to a dirty filter may trigger the pulse of air to clean the filter. Additionally, a manually operated button may even be used to trigger delivery of the air pulse. Another preferred triggering means 164 is a timer for cleaning the filter 152 at a predetermined time interval. A time interval approach provides a dependable, inexpensive, and simple way for maintaining a clean filter.

Another preferred embodiment of the filter system 150 uses a compressor (not shown) that is connected to reservoir 156 by connector 159. A pressure switch 160 controls the compressor and therefore the quantity of air pumped into the reservoir 156. The reservoir 156 is connected to the diaphragm valve 157 by conduit 158. A solenoid valve 164 controlled by a computer (not shown) responding to a predetermined event triggers the diaphragm valve 157 to deliver fluid to the filter 152. The resulting pulse of fluid cleans the filter 152.

A method of densifying and storing a recyclable commodity comprises the steps of: inserting the commodity through insert means 30 into a housing 11; densifying the commodity; pneumatically conveying the densified commodity for storage; filtering air being used to convey the densified commodity; and delivering a predetermined quantity of fluid under pressure to a filter 152 in a direction opposite to the usual flow of the air being used to convey the densified commodity, the fluid under pressure being used to clean the filter 152. Further, the method preferably includes the step of triggering the delivery of gas upon reaching a predetermined event.

A densified commodity storage assembly may use similar elements to those described above. The assembly could include storage means 12 for storing the densified commodity; and pneumatic means for conveying the densified commodity to the storage means 12. The already densified commodity could be pulled into the storage means in the same manner as the commodity densification and storage assembly.

Figure 13:
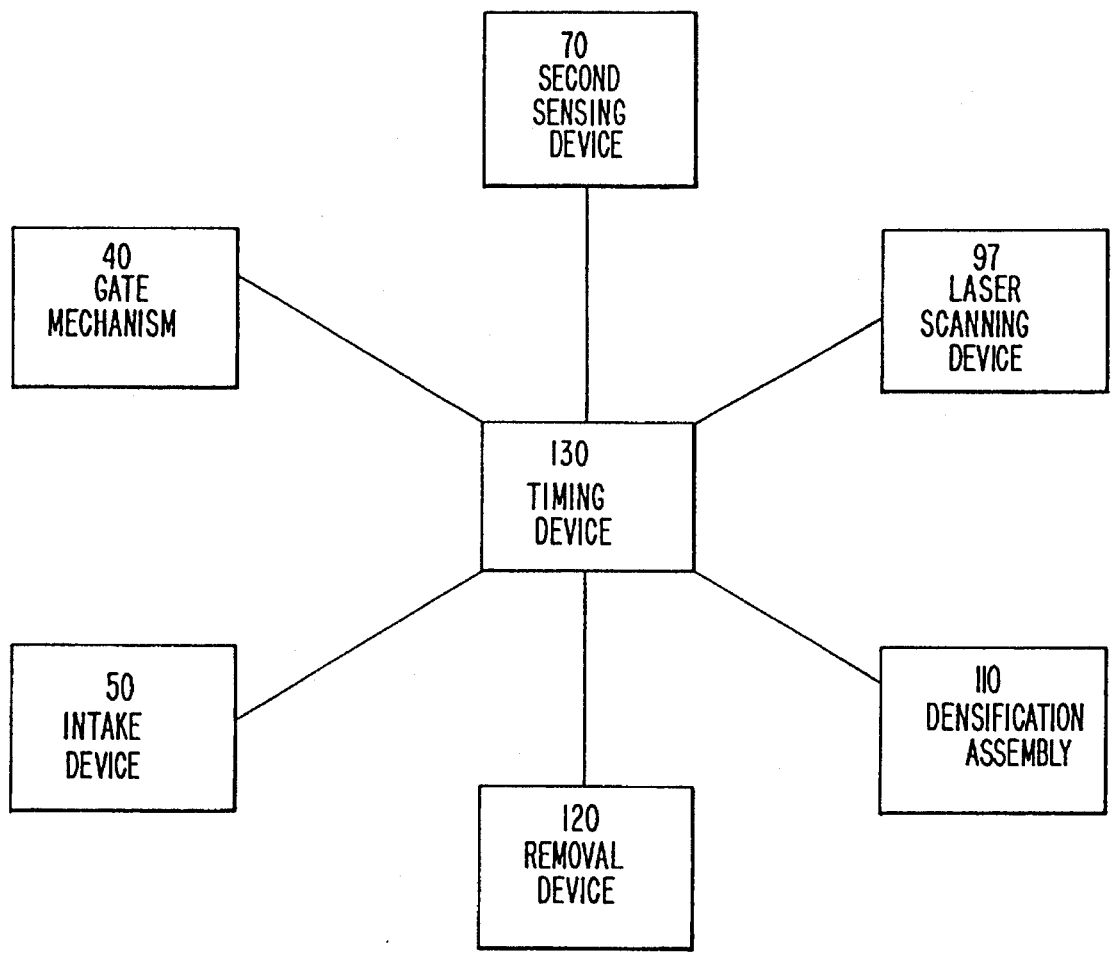
FIG. 13 is a block diagram generally depicting the timing means of the commodity collection, densification and storage assembly and its operational connection to the intake means, gate means, second sensor means, densification means and removal means.

In accordance with the invention, timing means are provided for coordinating a sequential operation of the intake means, gate means, second sensor means, densification means and removal means so that the assembly may receive a plurality of various commodities while maintaining the separation of each type of inserted commodity. As broadly depicted in FIG. 13, the timing means comprises a timing device 130 including a microprocessor operatively connected to the intake device 50, gate mechanism 40, second sensing and laser scanning devices 70, 97, densification assembly 110 and removal device 120. Further, the microprocessor which comprises the timing device 130 may also control the second sensing device 70 above.

Since an object of the present invention is to allow rapid recycling of a number of types of commodities in succession, the timing device 130 controls the sequential activation of the above portions of the assembly to achieve a minimum preferred processing speed of 45 cans per minute, 14 glass bottles per minute, and 6 plastic bottles per minute. The maximum preferred amount of transition time required for the timing device 130 to adjust the assembly to process commodities of different compositions is 3 seconds.

The timing device 130 initiates the action of the intake device 50 to draw in a second commodity at a variable time after the drawing in of a first commodity based on the information obtained by the second sensor device 70 regarding the first inserted commodity. Each of the compositions of commodities take different amounts of time to be processed by the assembly due to their inherent differences in size, weight, shape, etc. The timing device 130 ensures that an inserted commodity has passed into the densification assembly 110 before the next commodity is drawn into the housing by the intake device 50. Further, the sorter assembly 121 and the blower 127 must be properly activated to remove the densified commodities from the inlet pipes 126a–f to the storage means 12 to prevent clogging and mixture of different densified commodities in the first and second chutes 122, 123.

The timing device 130 enables more rapid utilization of the present invention. Densified commodities of different compositions and colors pass through the same path in the densification assembly 110, ramps 116, 117, and chutes 122, 123. Timing device 130 enables the assembly to operate quickly, while maintaining proper segregation of densified commodities. Thus, the use of the timing device allows the commodity collection, densification and storage assembly to simultaneously process several commodities thereby saving time for the consumer.

Preferably, payment means are provided for determining the number of commodities inserted and issuing at least one token in response. As broadly embodied herein, payment means comprises a payment assembly 140 including a microprocessor (not shown) for counting the number of commodities inserted and calculating the value of the token to be issued to the consumer. The token may comprise a redeemable voucher, receipt or coin. The microprocessor may be the same one utilized for the timing device 130, above.

In order to reduce the need for maintaining a supply of coins or currency, it is preferred that a printer be utilized for printing and issuing redeemable receipts or vouchers in response to the commodities received. These receipts or vouchers may have barcodes and can be later exchanged for merchandise or cash, thereby eliminating the need for storing currency or coins in the machine. Printing mechanisms known in the art such as those made by Atech or Cybertech may be readily incorporated into the assembly.

The timing device 130 may also, pursuant to signals received from shut-off sensors (not shown), either partially or totally prevent the assembly from accepting recyclable commodities. For example, if a storage bin 13, 14, 15 were full or an inlet pipe 126a–f were blocked, the timing device 130 would, pursuant to the information obtained by the second sensor device 70, refuse to accept any more of the corresponding type of recyclable commodity. The inserted commodity would be returned to the consumer through the reject port 32 as if it were a nonrecyclable commodity or a nonparticipating commodity.

The operation of the assembly shown in FIGS. 1–15 will now be described. The consumer begins by approaching the housing 11 with various commodities to be inserted. The consumer first chooses the type of token to be issued as payment means by, for example, pressing a button corresponding to a voucher, coin, or receipt. The consumer then inserts the first commodity into the proper insert port 30, 31 of the housing 11. Insertion of the commodity is detected by the infrared sensor device 61, thereby initiating the rotation of the rollers 52, 53 and belt 54 of the intake device 50. The gate mechanism 40 opens, and the inserted commodity is passed through the second sensor device 70 and laser scanning device 97. After the gate mechanism 40 is released from the opened position, the first sensor device 46 will determine whether the plates 41–44 close within milliseconds. If not, the intake device 50 is stopped and the gate mechanism 40 is reopened. When the object is removed from the gate mechanism 40 allowing it to close, the intake device 50 will resume operation.

The second sensor device 70 then senses the color, composition, weight and shape of the inserted commodity. The laser scanning device 97 scans the inserted commodity for a barcode, rotating the commodity if necessary.

The separation wheel 100, responsive to the information about the inserted commodity determined by the second sensor device 70 and laser scanning device 97, routes the inserted commodity accordingly. Nonparticipating commodities, steel cans, and heavy objects are rejected and returned to the consumer via the reject port 32. Plastic and aluminum commodities are sent to the shredding mechanism 111 for densification, and glass commodities are sent to the crushing mechanism 112 for densification. The densified commodities then pass down the ramps 116, 117 to the sorter assembly 121. First and second chutes 122, 123 transfer the densified commodities to the proper inlet pipe 126a–f to send the densified commodity to the storage means 12.

When the densified commodity reaches the inlet pipe 126a–f, the blower 127 is activated thereby transferring the densified commodity to the storage means 12. A filter 152 prevents the densified commodity from entering the blower 127. Upon reaching a predetermined event, a reservoir 156 delivers a fluid under pressure to the filter 152 causing the introduced fluid to pass through the filter 152 in a direction opposite the direction of air flow used to transfer the densified commodity. The introduced fluid cleans the filter 152.

Meanwhile, the consumer may push a button to receive payment for the inserted commodities, or the consumer may insert another commodity into the insert port 30, 31.

Due to the speed of the present invention in receiving commodities, the above activities of the assembly may often overlap when a plurality of commodities are inserted consecutively. For example, when a second commodity is inserted, the intake device 50 will begin to draw the commodity into the housing 11 once the previously inserted commodity is passed to the densification assembly 110.

Other embodiments of the invention will be apparent to those skilled in the art from consideration of the specification and practice of the invention disclosed herein. It is intended that the specification be considered as exemplary only, with a true scope and spirit being indicated by the following claims.

What is claimed is:

1. A commodity densification and storage assembly, comprising:

a housing having an insert port for receiving commodities;

sensor means, adjacent the insert port, for sensing at least one feature of the commodities;

a densification mechanism disposed in the housing downstream of the insert port for densifying the commodities, the densification mechanism including one of a crushing mechanism for crushing glass commodities and a shredding mechanism for shredding at least one of plastic and aluminum commodities;

a plurality of separate storage compartments, each for storing the densified commodities according to its sensed feature; and pneumatic means for conveying the densified commodities to the storage compartments, the pneumatic means including:

a. an inlet pipe for receiving the densified commodities from the densification mechanism and being in communication between the densification mechanism and each of the storage compartments;

b. a blower in communication with the storage compartments for creating suction, the blower drawing the densified commodities to the storage compartments through the inlet pipe; and c. a filter system for preventing densified commodities from entering the blower, the filter system comprising:

a filter positioned so that air passing through the inlet pipe and the storage compartments, passes through the filter in a first direction; and means for storing and delivering fluid under pressure to the filter causing the introduced fluid to pass through the filter in a second direction opposite the first direction for cleaning the filter.

2. The assembly of claim 1, wherein the means for storing and delivering includes a reservoir for storing fluid and a conduit for delivering fluid from the reservoir to the filter.

3. The assembly of claim 2, wherein the filter system further comprises a means for controlling the quantity of the fluid delivered from the reservoir to the filter.

4. The assembly of claim 3, wherein the controlling means is a diaphragm valve.

5. The assembly of claim 1, wherein the filter includes a surface for receiving air in the first direction, the surface being made of polytetrafluoroethylene.

6. The assembly of claim 5, wherein the surface of the filter has a polyester backing.

7. The assembly of claim 1, wherein the fluid is a gas.

8. The assembly of claim 7, wherein the gas is air.

9. The assembly of claim 1, wherein the filter system further comprises means for triggering the means for storing and delivering fluid to the filter.

10. The assembly of claim 9, wherein the triggering means is a solenoid valve.

11. The assembly of claim 9, wherein the triggering means is triggered when a commodity counter reaches a predetermined commodity count.

12. The assembly of claim 9, wherein the triggering means is triggered after a predetermined length of time.

13. The assembly of claim 9, wherein the triggering means is triggered by reaching a predetermined air pressure across the filter when the blower is operating.

14. The assembly of claim 1, further comprising sorter means for receiving the densified commodities from the densification mechanism and sorting them according to the sensed feature.

15. The assembly of claim 1, wherein the filter system further comprises a primary filter connected to the storage compartments for preventing densified commodities larger than a predetermined size from leaving the storage compartments.

16. A commodity densification and storage assembly, comprising:

a housing having an insert port for receiving commodities;

sensor means, adjacent the insert port, for sensing at least one feature of the commodities;

a densification mechanism disposed in the housing downstream of the insert port for densifying the commodities, the densification mechanism including one of a crushing mechanism for crushing glass commodities and a shredding mechanism for shredding at least one of plastic and aluminum commodities;

sorter means for receiving the densified commodities from the densification mechanism and sorting them according to its sensed feature;

storage compartments, each for storing the densified commodities according to the sensed feature; and pneumatic means for conveying the densified commodities to the storage compartments, the pneumatic means including:

a. an inlet pipe for receiving the densified commodities from the sorter means and being in communication between the sorter means and each of the storage compartments;

b. a blower in communication with the storage compartments for creating suction, the blower drawing the densified commodities to the storage compartments through the inlet pipe; and c. a filter system for preventing densified commodities from entering the blower, the filter system comprising:

a filter positioned so that air passing through the inlet pipe and the storage compartments, passes through the filter in a first direction, the filter having a surface made of polytetrafluoroethylene;

means for storing and delivering fluid under pressure to the filter causing the introduced fluid to pass through the filter in a second direction opposite the first direction for cleaning the filter; and means for triggering the means for storing and delivering fluid to the filter.

17. The assembly of claim 16, wherein the filter system further comprises a primary filter connected to the storage compartments for preventing densified commodities larger than a predetermined size from leaving the storage compartments.

18. A method of densifying and storing recyclable commodities comprising the steps of:

inserting the commodities one at a time through insert means into a housing;

sensing at least one feature of each commodity;

densifying the commodities in one of a crusher and a shredder, the crusher for crushing glass commodities and the shredder for shredding at least one of plastic and aluminum commodities;

pneumatically conveying via suction the densified commodities to storage compartments using air travelling in a first direction; storing the densified commodities in each of the storage compartments according to the sensed feature;

filtering the air used to convey the densified commodities; and delivering a predetermined quantity of fluid under pressure to a filter in a second direction opposite to the first direction, the fluid under pressure being used for cleaning the filter.

19. The method of claim 18, further comprising the step of triggering the delivery of fluid upon reaching a predetermined event.

20. A storage assembly for conveying and storing densified commodities, comprising:

a plurality of separate storage compartments for storing the densified commodities according to at least one feature of the commodities; and pneumatic means for conveying the densified commodities to the storage compartments, the pneumatic means including:

a. an inlet pipe for receiving the densified commodities, the inlet pipe being in communication between the densified commodities and the storage compartments;

b. a blower in communication with the storage compartments for creating suction, the blower drawing the densified commodities to the storage compartments through the inlet pipe; and c. a filter system for preventing densified commodities from entering the blower, the filter system comprising:

a filter positioned so that air passing through the inlet pipe and the storage compartments, passes through the filter in a first direction, the filter having a polytetrafluoroethylene surface for receiving air in the first direction;

means for storing and delivering fluid under pressure to the filter causing the introduced fluid to pass through the filter in a second direction opposite the first direction for cleaning the filter; and means for triggering the means for storing and delivering fluid to the filter.

21. The assembly of claim 20, wherein the means for storing and delivering includes a reservoir for storing fluid and a conduit for delivering fluid from the reservoir to the filter.

22. The assembly of claim 21, wherein the filter system further comprises a means for controlling the quantity of the fluid delivered from the reservoir to the filter.

* * * * *